US012051430B2

(12) United States Patent
Moriya et al.

(10) Patent No.: US 12,051,430 B2
(45) **Date of Patent: *Jul. 30, 2024**

(54) CODING DEVICE, DECODING DEVICE, AND METHOD AND PROGRAM THEREOF

(71) Applicant: NIPPON TELEGRAPH AND TELEPHONE CORPORATION, Tokyo (JP)

(72) Inventors: Takehiro Moriya, Atsugi (JP); Yutaka Kamamoto, Atsugi (JP); Noboru Harada, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,015

(22) Filed: May 9, 2023

(65) Prior Publication Data

US 2023/0306976 A1 Sep. 28, 2023

Related U.S. Application Data

(63) Continuation of application No. 17/370,060, filed on Jul. 8, 2021, now Pat. No. 11,694,702, which is a (Continued)

(30) Foreign Application Priority Data

May 1, 2014 (JP) ................................ 2014-094758

(51) Int. Cl.
*G10L 19/00* (2013.01)
*G10L 19/038* (2013.01)

(Continued)

(52) U.S. Cl.
CPC ............ *G10L 19/07* (2013.01); *G10L 19/038* (2013.01); *G10L 2019/0016* (2013.01); *G10L 19/005* (2013.01)

(58) Field of Classification Search
CPC ..... G10L 19/07; G10L 19/038; G10L 19/005; G10L 2019/0001; G10L 19/008;

(Continued)

(56) References Cited

U.S. PATENT DOCUMENTS 5,778,334 A 7/1998 Ozawa
6,122,608 A 9/2000 Mccree (Continued)

FOREIGN PATENT DOCUMENTS

DE 60028500 T2 * 1/2007 .......... G10L 19/083
EP 3139382 M 11/2017

OTHER PUBLICATIONS

International Search Report issued Apr. 14, 2015 in PCT/JP2015/057727 filed Mar. 16, 2015.

(Continued)

*Primary Examiner* — Michael Ortiz-Sanchez
(74) *Attorney, Agent, or Firm* — Oblon, McClelland, Maier & Neustadt, L.L.P.

(57) ABSTRACT

A coding method and a decoding method are provided which can use in combination a predictive coding and decoding method which is a coding and decoding method that can accurately express coefficients which are convertible into linear prediction coefficients with a small code amount and a coding and decoding method that can obtain correctly, by decoding, coefficients which are convertible into linear prediction coefficients of the present frame if a linear prediction coefficient code of the present frame is correctly input to a decoding device. A coding device includes: a predictive coding unit that obtains a first code by coding a (Continued)

differential vector formed of differentials between a vector of coefficients which are convertible into linear prediction coefficients of more than one order of the present frame and a prediction vector containing at least a predicted vector from a past frame, and obtains a quantization differential vector corresponding to the first code; and a non-predictive coding unit that generates a second code by coding a correction vector which is formed of differentials between the vector of the coefficients which are convertible into the linear prediction coefficients of more than one order of the present frame and the quantization differential vector or formed of some of elements of the differentials.

7 Claims, 14 Drawing Sheets

Related U.S. Application Data continuation of application No. 16/527,160, filed on Jul. 31, 2019, now Pat. No. 11,120,809, which is a continuation of application No. 15/307,059, filed as application No. PCT/JP2015/057727 on Mar. 16, 2015, now Pat. No. 10,418,042.

(51) Int. Cl.
*G10L 19/07* (2013.01)
*G10L 21/00* (2013.01)
*G10L 19/005* (2013.01)

(58) Field of Classification Search
CPC ..... G10L 2019/0016; G10L 2019/0012; G10L 2019/0011; G10L 19/032; G10L 19/06; G10L 19/16
See application file for complete search history.

(56) References Cited

U.S. PATENT DOCUMENTS

| | | | |
|---|---|---|---|
| 6,757,654 | B1 | 6/2004 | Westerlund |
| 7,383,177 | B2 | 6/2008 | Yamaura |
| 8,068,042 | B2 | 11/2011 | Harada |
| 8,463,602 | B2 | 6/2013 | Oshikiri |
| 8,892,428 | B2 | 11/2014 | Oshikiri |
| 9,424,830 | B2 | 8/2016 | Togawa |
| 9,852,741 | B2 | 12/2017 | Salami |
| 2002/0173951 | A1 | 11/2002 | Ehara |
| 2004/0176951 | A1 | 9/2004 | Sung |
| 2009/0248404 | A1 | 10/2009 | Ehara |
| 2010/0145712 | A1 | 6/2010 | Kovesi |
| 2010/0153121 | A1 | 6/2010 | Toguri |
| 2013/0028426 | A1 | 1/2013 | Purnhagen |
| 2014/0236588 | A1 | 8/2014 | Subasingha |
| 2015/0302861 | A1 | 10/2015 | Salam i |
| 2016/0093311 | A1 | 3/2016 | Kim |
| 2016/0232909 | A1 | 8/2016 | Fuchs |
| 2016/0293173 | A1 | 10/2016 | Faure |
| 2018/0075856 | A1 | 3/2018 | Salam i |

OTHER PUBLICATIONS

ITU-T, G.729, Telecommunication Standardization Sector of ITU, General Aspects of Digital Transmission Systems: Coding of Speech at 8 kbit/s Using Conjugate-Structure Algebraic-Code-Excited Linear-Prediction (CS-ACELP), (Mar. 1996), 38 pages.

Office Action issued Sep. 19, 2017 in Korean Patent Application No. 10-2016-7030130 (with English language translation).

ITU-T Recommendation G.718. "Frame error robust narrow-band and wideband embedded variable bit-rate coding of speech and audio from 8-32 kbit/s" ITU-T, 2008, 255 Pages.

Frank K. Soong, et al., "Line Spectrum Pair (LSP) and Speech Data Compression", IEEE International Conference on Acoustics, Speech, and Signal Processing (ICASSP'84), 1984, 4 pages.

Extended Search Report issued Oct. 24, 2017 in European Patent Application No. 15786812.6.

ITU-T, G.729, Telecommunication Standardization Sector of ITU, Series G: Transmission Systems and Media,Digital Systems and Networks, Digital terminal equipments—Coding of voice and audio signals, Coding of speech at 8 kbit/s using conjugate-structure algebraic-code-excited linear-prediction (CS-ACELP), (Jun. 2012), XP055234042, 152 pages.

M. Jelinek, T. Vaillancourt and J. Gibbs, "G. 718: A new embedded speech and audio coding standard with high resilience to error-prone transmission channels," in IEEE Communications Magazine, vol. 47, No. 10, pp. 117-123, Oct. 2009, doi: 10.1109/MCOM.2009.5273818. (Year: 2009).

H. Zarrinkoub and P. Mermelstein, "Switched prediction and quantization of LSP frequencies," 1996 IEEE International Conference on Acoustics, Speech, and Signal Processing Conference Proceedings, Atlanta, GA, USA, 1996, pp. 757-760 vol. 2, doi: 10.1109/ICASSP.1996.543231. (Year: 1996).

* cited by examiner

CODING DEVICE, DECODING DEVICE, AND METHOD AND PROGRAM THEREOF

CROSS-REFERENCE TO RELATED APPLICATIONS

This application is a continuation of and claims the benefit of priority under 35 U.S.C. § 120 from U.S. application Ser. No. 17/370,060 filed Jul. 8, 2021, which is a continuation of U.S. application Ser. No. 16/527,160 filed Jul. 31, 2019 (now U.S. Pat. No. 11,120,809 issued Sep. 14, 2021), which is a continuation of U.S. application Ser. No. 15/307,059 filed Oct. 27, 2016 (now U.S. Pat. No. 10,418,042 issued Sep. 17, 2019), the entire contents of which are incorporated herein by reference. U.S. application Ser. No. 15/307,059 is a National Stage of PCT/JP2015/057727 filed Mar. 16, 2015, which claims the benefit of priority under 35 U.S.C. § 119 from Japanese Application No. 2014-094758 filed May 1, 2014.

TECHNICAL FIELD

The present invention relates to a coding technology and a decoding technology of coding and decoding linear prediction coefficients and coefficients which are convertible thereinto.

BACKGROUND ART

In coding of sound signals such as speech and music, a method of performing the coding by using linear prediction coefficients obtained by performing linear prediction analysis on an input sound signal is widely used.

In order to make it possible to obtain, on the part of a decoding device, the information on the linear prediction coefficients used in coding processing by decoding, a coding device codes the linear prediction coefficients and sends a code corresponding to the linear prediction coefficients to the decoding device. In Non-patent Literature 1, a coding device converts linear prediction coefficients into a sequence of LSP (Line Spectrum Pair) parameters which are parameters in a frequency domain and equivalent to the linear prediction coefficients and sends an LSP code obtained by coding the sequence of LSP parameters to a decoding device.

In Non-patent Literature 1, in order to reduce the code amount of the LSP code, a vector coding and decoding technology using moving average prediction (MA prediction) is used.

First, the flow of coding processing will be described.

<Linear Prediction Coefficient Coding Device 80>

FIG. 1 depicts the configuration of an existing linear prediction coefficient coding device 80.

To the linear prediction coefficient coding device 80, LSP (Line Spectrum Pairs) parameters $\theta_f[1], \theta_f[2], \ldots, \theta_f[p]$ of each frame are input, and the linear prediction coefficient coding device 80 performs the following processing of a predictive subtraction unit 83, a vector coding unit 84, and a delay input unit 87 on a frame-by-frame basis, obtains an LSP code $C_f$, and outputs the LSP code $C_f$. Incidentally, f represents a frame number and p represents a prediction order.

When an input sound signal $X_f$ is input to the linear prediction coefficient coding device 80, the linear prediction coefficient coding device 80 is also provided with a linear prediction analysis unit 81 and an LSP calculation unit 82, and the frame-by-frame input sound signals $X_f$ are consecutively input thereto and the following processing is performed on a frame-by-frame basis.

Hereinafter, specific processing of each unit will be described.

<Linear Prediction Analysis Unit 81>

The linear prediction analysis unit 81 receives the input sound signal $X_f$, performs linear prediction analysis on the input sound signal $X_f$, obtains linear prediction coefficients $a_f[1], a_f[2], \ldots, a_f[p]$, and outputs the linear prediction coefficients $a_f[1], a_f[2], \ldots, a_f[p]$. Here, $a_f[i]$ represents an ith-order linear prediction coefficient that is obtained by performing linear prediction analysis on an input sound signal $X_f$ of an fth frame.

<LSP Calculation Unit 82>

The LSP calculation unit 82 receives the linear prediction coefficients $a_f[1], a_f[2], \ldots, a_f[p]$, obtains LSP parameters $\theta_f[1], \theta_f[2], \ldots, \theta_f[p]$ from the linear prediction coefficients $a_f[1], a_f[2], \ldots, a_f[p]$, and outputs an LSP parameter vector $\Theta_f=(\theta_f[1], \theta_f[2], \ldots, \theta_f[p])^T$ that is a vector using the obtained LSP parameters as elements thereof. Here, $\theta_f[i]$ is an ith-order LSP parameter corresponding to the input sound signal $X_f$ of the fth frame.

<Predictive Subtraction Unit 83>

The predictive subtraction unit 83 is formed of, for example, a storage 83*c* storing a predetermined coefficient α, a storage 83*d* storing a predictive mean vector V, a multiplication unit 88, and subtraction units 83*a* and 83*b*.

The predictive subtraction unit 83 receives the LSP parameter vector $\Theta_f$ and a preceding-frame quantization differential vector $\hat{S}_{f-1}$.

The predictive subtraction unit 83 generates a differential vector $S_f=\Theta_f-V-\alpha\times\hat{S}_{f-1}=(s_f[1], s_f[2], \ldots, s_f[p])^T$ that is a vector obtained by subtracting the predictive mean vector V and a vector $\alpha\hat{S}_{f-1}$ from the LSP parameter vector $\Theta_f$ and outputs the differential vector $S_f$.

Incidentally, the predictive mean vector $V=(v[1], v[2], \ldots, v[p])^T$ is a predetermined vector stored in the storage 83*d* and simply has to be obtained in advance from, for example, a sound signal for learning. For example, in the linear prediction coefficient coding device 80, by using a sound signal picked up in the same environment (for instance, the same speaker, sound pick-up device, and place) as the sound signal to be coded as an input sound signal for learning, LSP parameter vectors of many frames are obtained, and the average thereof is used as the predictive mean vector.

The multiplication unit 88 obtains a vector $\alpha\times\hat{S}_{f-1}$ by multiplying a decoded differential vector $\hat{S}_{f-1}$ of a preceding frame by the predetermined coefficient a stored in the storage 83*c*.

Incidentally, in FIG. 1, by using the two subtraction units 83*a* and 83*b*, first, after the predictive mean vector V stored in the storage 83*d* is subtracted from the LSP parameter vector $\Theta_f$ in the subtraction unit 83*a*, the vector $\alpha\times\hat{S}_{f-1}$ is subtracted in the subtraction unit 83*b*, but the above may be performed the other way around. Alternatively, the differential vector $S_f$ may be generated by subtracting, from the LSP parameter vector $\Theta_f$, a vector $V+\alpha\times\hat{S}_{f-1}$ obtained by adding the predictive mean vector V and the vector $\alpha\times\hat{S}_{f-1}$.

The differential vector $S_f$ of the present frame may also be called a vector that is obtained by subtracting a vector containing at least a prediction based on a past frame from a vector (an LSP parameter vector $\Theta_f$) based on coefficients which are convertible into linear prediction coefficients of more than one order of the present frame.

<Vector Coding Unit 84>

The vector coding unit 84 receives the differential vector $S_f$, codes the differential vector $S_f$, and obtains an LSP code $C_f$ and a quantization differential vector $\hat{S}_f=(\hat{s}_f[1], \hat{s}_f[2], \ldots, \hat{s}_f[p])^T$ corresponding to the LSP code $C_f$ and outputs the LSP code $C_f$ and the quantization differential vector $\hat{S}_f$. For coding of the differential vector $S_f$, any one of the well-known coding methods may be used, such as a method of vector quantizing the differential vector $S_f$, a method of dividing the differential vector $S_f$ into a plurality of subvectors and vector quantizing each of the subvectors, a method of multistage vector quantizing the differential vector $S_f$ or the subvectors, a method of scalar quantizing the elements of a vector, and a method obtained by combining these methods.

Here, an example of a case in which the method of vector quantizing the differential vector $S_f$ is used will be described.

The vector coding unit 84 searches for a candidate differential vector closest to the differential vector $S_f$ from a plurality of candidate differential vectors stored in a vector codebook 86 and outputs the candidate differential vector as the quantization differential vector $\hat{S}_f$, and outputs a differential vector code corresponding to the quantization differential vector $\hat{S}_f$ as the LSP code $C_f$. Incidentally, the quantization differential vector $\hat{S}_f$ corresponds to a decoded differential vector which will be described later.

<Vector Codebook 86>

In the vector codebook 86, candidate differential vectors and differential vector codes corresponding to the candidate differential vectors are stored in advance.

<Delay Input Unit 87>

The delay input unit 87 receives the quantization differential vector $\hat{S}_f$, holds the quantization differential vector $\hat{S}_f$, delays the quantization differential vector $\hat{S}_f$ by one frame, and outputs the resultant vector as a preceding-frame quantization differential vector $\hat{S}_{f-1}$. That is, if the predictive subtraction unit 83 has performed processing on a quantization differential vector $\hat{S}_f$ of an fth frame, the delay input unit 87 outputs a quantization differential vector $\hat{S}_{f-1}$ on an f-1th frame.

<Linear Prediction Coefficient Decoding Device 90>

FIG. 2 depicts the configuration of an existing linear prediction coefficient decoding device 90. To the linear prediction coefficient decoding device 90, frame-by-frame LSP codes $C_f$ are consecutively input, and the linear prediction coefficient decoding device 90 obtains a decoded predictive LSP parameter vector $\hat{\Theta}f=(\hat{}_f[1], \hat{}_f[2], \ldots, \hat{}_f[p])$ by decoding the LSP code $C_f$ on a frame-by-frame basis.

Hereinafter, specific processing of each unit will be described.

<Vector Decoding Unit 91>

A vector decoding unit 91 receives the LSP code $C_f$, decodes the LSP code $C_f$, obtains a decoded differential vector $\hat{S}_f$ corresponding to the LSP code $C_f$, and outputs the decoded differential vector $\hat{S}_f$. For decoding of the LSP code $C_f$, a decoding method corresponding to the coding method adopted by the vector coding unit 84 of the coding device is used.

Here, an example of a case in which a decoding method corresponding to the method adopted by the vector coding unit 84, the method of vector quantizing the differential vector $S_f$, is used will be described.

The vector decoding unit 91 searches for a plurality of differential vector codes corresponding to the LSP code $C_f$ from differential vector codes stored in a vector codebook 92 and outputs a candidate differential vector corresponding to the differential vector codes as the decoded differential vector $\hat{S}_f$. Incidentally, the decoded differential vector $\hat{S}_f$ corresponds to the above-described quantization differential vector $\hat{S}_f$ and corresponding elements take the same values if there are no transmission errors and no errors and the like in the course of coding and decoding.

<Vector Codebook 92>

In the vector codebook 92, the candidate differential vectors and the differential vector codes corresponding to the candidate differential vectors are stored in advance. Incidentally, the vector codebook 92 shares information in common with the vector codebook 86 of the above-described linear prediction coefficient coding device 80.

<Delay Input Unit 93>

A delay input unit 93 receives the decoded differential vector $\hat{S}_f$, holds the decoded differential vector $\hat{S}_f$, delays the decoded differential vector $\hat{S}_f$ by one frame, and outputs the resultant vector as a preceding-frame decoded differential vector $\hat{S}_{f-1}$. That is, if a predictive addition unit 95 performs processing on a decoded differential vector $\hat{S}_f$ of an fth frame, the delay input unit 93 outputs a decoded differential vector $\hat{S}_{f-1}$ of an f-1th frame.

<Predictive Addition Unit 95>

A predictive addition unit 95 is formed of, for example, a storage 95*c* storing a predetermined coefficient $\alpha$, a storage 95*d* storing a predictive mean vector V, a multiplication unit 94, and addition units 95*a* and 95*b*.

The predictive addition unit 95 receives the decoded differential vector $\hat{S}_f$ of the present frame and the preceding-frame decoded differential vector $\hat{S}_{f-1}$.

The predictive addition unit 95 generates a decoded predictive LSP parameter vector $\hat{\Theta}_f$ $(=\hat{S}_f+V+\alpha\hat{S}_{f-1})$ that is a vector obtained by adding the decoded differential vector $\hat{S}_f$, the predictive mean vector $V=(v[1], v[2], \ldots, v[N])^T$, and a vector $\alpha\times\hat{S}_{f-1}$ and outputs the decoded predictive LSP parameter vector $\hat{\Theta}_f$.

The multiplication unit 94 obtains the vector $\alpha\times\hat{S}_{f-1}$ by multiplying the preceding-frame decoded differential vector $\hat{S}_{f-1}$ by the predetermined coefficient a stored in the storage 95*c*.

In FIG. 2, by using the two addition units 95*a* and 95*b*, first, after the vector $\alpha\times\hat{S}_{f-1}$ is added to the decoded differential vector $\hat{S}_f$ of the present frame in the addition unit 95*a*, the predictive mean vector V is added in the addition unit 95*b*, but the above may be performed the other way around. Alternatively, the decoded predictive LSP parameter vector $\hat{\Theta}_f$ may be generated by adding a vector obtained by adding the vector $\alpha\times\hat{S}_{f-1}$ and the predictive mean vector V to the decoded differential vector $\hat{S}_f$.

Incidentally, it is assumed that the predictive mean vector V used here is the same as the predictive mean vector V used in the predictive subtraction unit 83 of the above-described linear prediction coefficient coding device 80.

<Decoded Predictive Linear Prediction Coefficient Calculation Unit 96>

If linear prediction coefficients are necessary, the linear prediction coefficient decoding device 90 may be provided with a decoded predictive linear prediction coefficient calculation unit 96. In this case, the decoded predictive linear prediction coefficient calculation unit 96 receives the decoded predictive LSP parameter vector $\hat{\Theta}_f$, converts the decoded predictive LSP parameter vector $\hat{\Phi}_f$ into decoded predictive linear prediction coefficients $\hat{a}_f[1], \hat{a}_f[2], \ldots, \hat{a}_f[p]$, and outputs the decoded predictive linear prediction coefficients $\hat{a}_f[1], \hat{a}_f[2], \ldots, \hat{a}_f[p]$.

PRIOR ART LITERATURE

Non-Patent Literature

Non-patent Literature 1: "ITU-T Recommendation G.729", ITU, 1996

SUMMARY OF THE INVENTION

Problems to be Solved by the Invention

In the linear prediction coefficient decoding device of Non-patent Literature 1, since decoding processing of an fth frame is performed by using the decoded differential vector $\hat{S}_{f-1}$ which is the decoding result of an f-1th frame, not only when a transmission error occurs in an LSP code of the present frame, but also when a transmission error occurs in an LSP code of the immediately preceding frame, LSP parameters of the present frame also cannot be decoded correctly.

In the linear prediction coefficient decoding device of Non-patent Literature 1, since the LSP parameters obtained by decoding are used only for linear prediction synthesis, even when the LSP parameters cannot be decoded correctly, this merely causes a reduction in the sound quality of the decoded sound signal in a plurality of consecutive frames. That is, it can be said that the linear prediction coefficient coding device and the linear prediction coefficient decoding device of Non-patent Literature 1 have a configuration which gives a higher priority to expressing the LSP parameters with a small code amount than to a problem which will arise when the LSP parameters cannot be decoded correctly.

However, the linear prediction coefficient coding device and the linear prediction coefficient decoding device are also used in a coding device and a decoding device which use the LSP parameters not only for linear prediction analysis and synthesis, but also for variable-length coding and decoding depending on the amplitude values forming a spectral envelope which is determined from the LSP parameters. In this case, the following problem arises: if the LSP parameters cannot be decoded correctly in one frame, variable-length decoding cannot be performed correctly in a plurality of consecutive frames including that frame, which makes it impossible to obtain a decoded sound signal.

In view of such a problem, an object of the present invention is to provide a coding method and a decoding method of coding and decoding coefficients which are convertible into linear prediction coefficients, the coding method and the decoding method that can use in combination predictive coding method and decoding method which are a coding method and a decoding method that can accurately express coefficients which are convertible into linear prediction coefficients with a small code amount, the coefficients such as those used in linear prediction analysis and synthesis, for example, and a coding method and a decoding method which can obtain correctly, by decoding, coefficients which are convertible into linear prediction coefficients of the present frame, even when a linear prediction coefficient code (for example, an LSP code) that is a code corresponding to coefficients which are convertible into linear prediction coefficients of a preceding frame, the coefficients such as those used in variable-length coding/decoding depending on the amplitude values forming a spectral envelope which is determined from LSP parameters, for example, is not correctly input to a linear prediction coefficient decoding device, if a linear prediction coefficient code of the present frame is correctly input to the linear prediction coefficient decoding device.

Means to Solve the Problems

In order to solve the above-described problem, according to one aspect of the present invention, a coding device includes: a predictive coding unit that obtains a first code by coding a differential vector formed of differentials between a vector of coefficients which are convertible into linear prediction coefficients of more than one order of a present frame and a prediction vector containing at least a predicted vector from a past frame, and obtains a quantization differential vector corresponding to the first code; and a non-predictive coding unit that generates a second code by coding a correction vector which is formed of differentials between the vector of the coefficients which are convertible into the linear prediction coefficients of more than one order of the present frame and the quantization differential vector or formed of some of elements of the differentials.

In order to solve the above-described problem, according to another aspect of the present invention, a coding device includes: a predictive coding unit that obtains a first code by coding a differential vector formed of differentials between a vector of coefficients which are convertible into linear prediction coefficients of more than one order of a present frame and a prediction vector formed of at least a prediction based on a past frame and a predetermined vector, and obtains a quantization differential vector corresponding to the first code; and a non-predictive coding unit that generates a second code by coding a correction vector which is formed of differentials obtained by subtracting the quantization differential vector and the predetermined vector from the vector of the coefficients which are convertible into the linear prediction coefficients of more than one order of the present frame or formed of some of elements of the differentials.

In order to solve the above-described problem, according to another aspect of the present invention, a decoding device includes: a predictive decoding unit that obtains a decoded differential vector by decoding a first code and generates a first decoded vector formed of decoded values of coefficients which are convertible into linear prediction coefficients of more than one order of a present frame by adding the decoded differential vector and a prediction vector containing at least a prediction based on a past frame; and a non-predictive decoding unit that obtains a decoded correction vector by decoding a second code and generates a second decoded vector formed of decoded values of the coefficients which are convertible into the linear prediction coefficients of more than one order of the present frame by adding elements of the decoded correction vector and at least elements of corresponding orders of the decoded differential vector.

In order to solve the above-described problem, according to another aspect of the present invention, a decoding device includes: a predictive decoding unit that obtains a decoded differential vector by decoding a first code and generates a first decoded vector formed of decoded values of coefficients which are convertible into linear prediction coefficients of more than one order of a present frame by adding the decoded differential vector and a prediction vector formed of at least a prediction based on a past frame and a predetermined vector; and a non-predictive decoding unit that obtains a decoded correction vector by decoding a second code and generates a second decoded vector formed of decoded values of the coefficients which are convertible into the linear prediction coefficients of more than one order of the present frame by adding, to the decoded correction vector, at least the decoded differential vector and the predetermined vector for each of elements of corresponding orders.

In order to solve the above-described problem, according to another aspect of the present invention, a coding method includes: a predictive coding step of obtaining a first code by coding a differential vector formed of differentials between a vector of coefficients which are convertible into linear prediction coefficients of more than one order of a present frame and a prediction vector containing at least a predicted vector from a past frame, and obtaining a quantization differential vector corresponding to the first code; and a non-predictive coding step of generating a second code by coding a correction vector which is formed of differentials between the vector of the coefficients which are convertible into the linear prediction coefficients of more than one order of the present frame and the quantization differential vector or formed of some of elements of the differentials.

In order to solve the above-described problem, according to another aspect of the present invention, a coding method includes: a predictive coding step of obtaining a first code by coding a differential vector formed of differentials between a vector of coefficients which are convertible into linear prediction coefficients of more than one order of a present frame and a prediction vector formed of at least a prediction based on a past frame and a predetermined vector, and obtaining a quantization differential vector corresponding to the first code; and a non-predictive coding step of generating a second code by coding a correction vector which is formed of differentials obtained by subtracting the quantization differential vector and the predetermined vector from the vector of the coefficients which are convertible into the linear prediction coefficients of more than one order of the present frame or formed of some of elements of the differentials.

In order to solve the above-described problem, according to another aspect of the present invention, a decoding method includes: a predictive decoding step of obtaining a decoded differential vector by decoding a first code and generating a first decoded vector formed of decoded values of coefficients which are convertible into linear prediction coefficients of more than one order of a present frame by adding the decoded differential vector and a prediction vector containing at least a prediction based on a past frame; and a non-predictive decoding step of obtaining a decoded correction vector by decoding a second code and generating a second decoded vector formed of decoded values of the coefficients which are convertible into the linear prediction coefficients of more than one order of the present frame by adding elements of the decoded correction vector and at least elements of corresponding orders of the decoded differential vector.

In order to solve the above-described problem, according to another aspect of the present invention, a decoding method includes: a predictive decoding step of obtaining a decoded differential vector by decoding a first code and generating a first decoded vector formed of decoded values of coefficients which are convertible into linear prediction coefficients of more than one order of a present frame by adding the decoded differential vector and a prediction vector formed of at least a prediction based on a past frame and a predetermined vector; and a non-predictive decoding step of obtaining a decoded correction vector by decoding a second code and generating a second decoded vector formed of decoded values of the coefficients which are convertible into the linear prediction coefficients of more than one order of the present frame by adding, to the decoded correction vector, at least the decoded differential vector and the predetermined vector for each of elements of corresponding orders.

Effects of the Invention

The present invention produces the effect of being able to use in combination predictive coding method and decoding method which are a coding method and a decoding method that can accurately express coefficients which are convertible into linear prediction coefficients with a small code amount and a coding method and a decoding method which can obtain correctly, by decoding, coefficients which are convertible into linear prediction coefficients of the present frame, even when a linear prediction coefficient code of a preceding frame is not correctly input to a linear prediction coefficient decoding device, if a linear prediction coefficient code of the present frame is correctly input to the linear prediction coefficient decoding device.

DETAILED DESCRIPTION OF THE EMBODIMENTS

Figure 1:
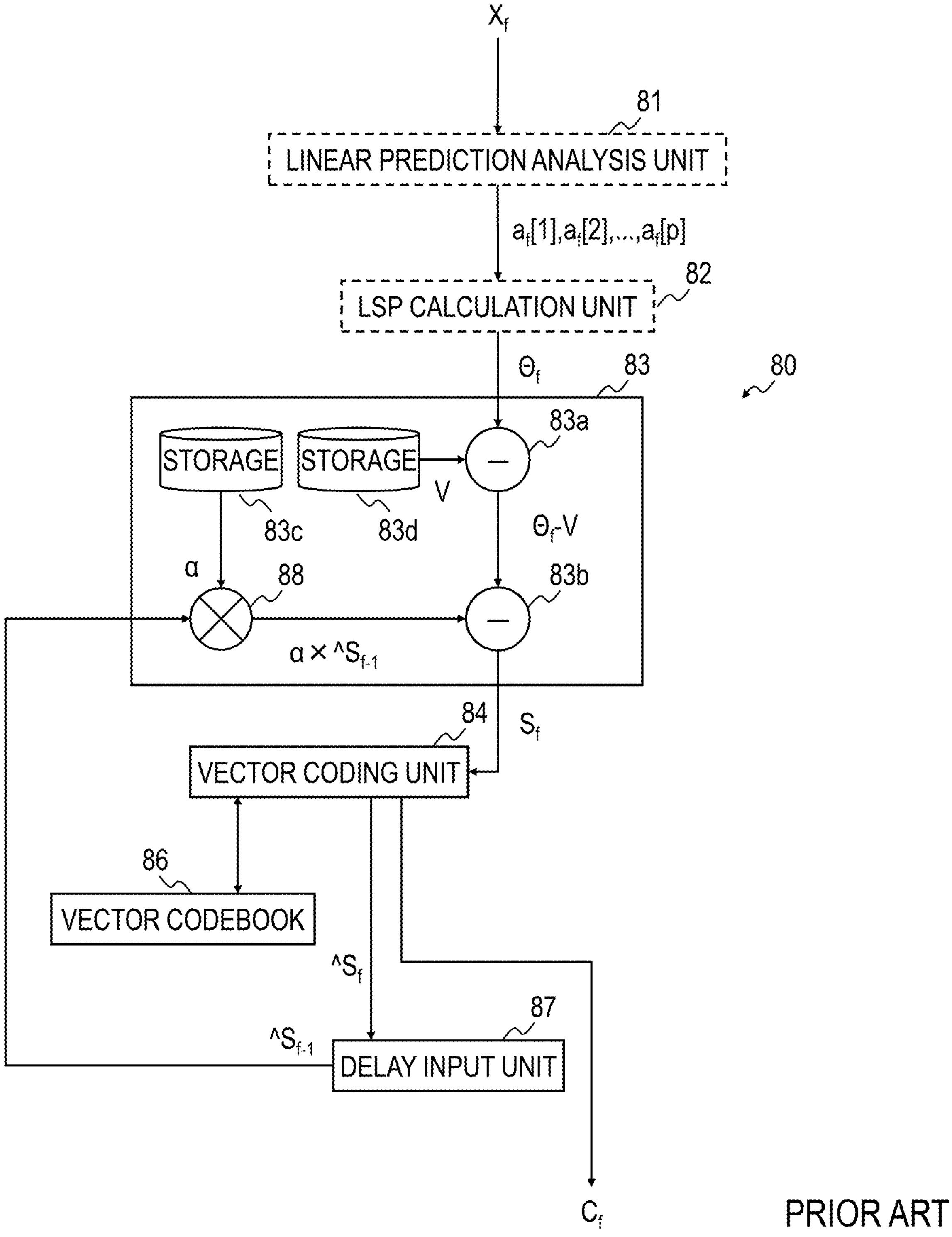
PRIOR ART FIG. 1
FIG. 1 is a diagram depicting the configuration of an existing linear prediction coefficient coding device.
Figure 2:
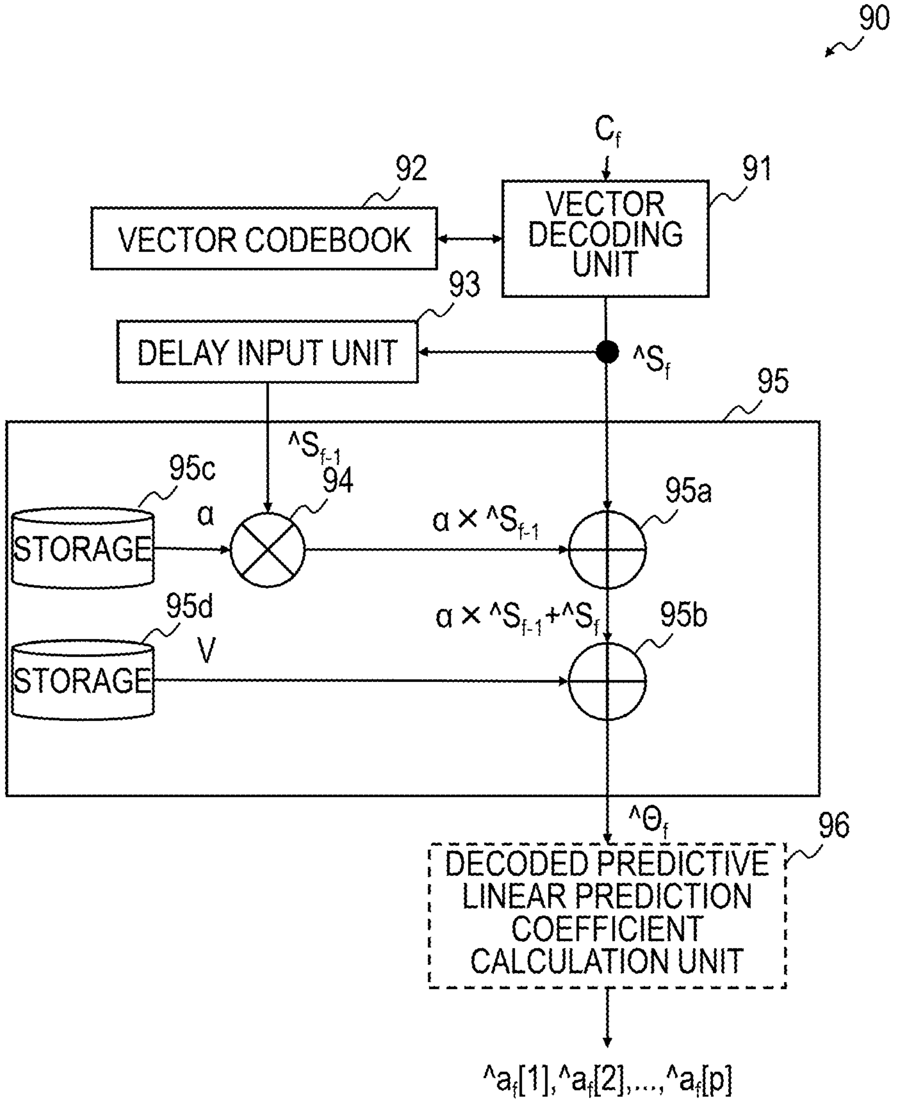
PRIOR ART FIG. 2
FIG. 2 is a diagram depicting the configuration of an existing linear prediction coefficient decoding device.

Hereinafter, embodiments of the present invention will be described. Incidentally, in the drawings which are used in the following description, component elements having the same function and steps in which the same processing is performed are identified with the same characters and overlapping explanations will be omitted. In the following description, symbols such as "^", "~", and "–" used in this text are supposed to be written immediately above letters immediately following these symbols, but, due to a restriction imposed by text notation, they are written immediately before the letters. In formulae, these symbols are written in their proper positions. Moreover, it is assumed that processing which is performed for each element of the elements of a vector and a matrix is applied to all the elements of the vector and the matrix unless otherwise specified.

First Embodiment

Hereinafter, differences from the existing linear prediction coefficient coding device and linear prediction coefficient decoding device will be mainly described.

Figure 3:
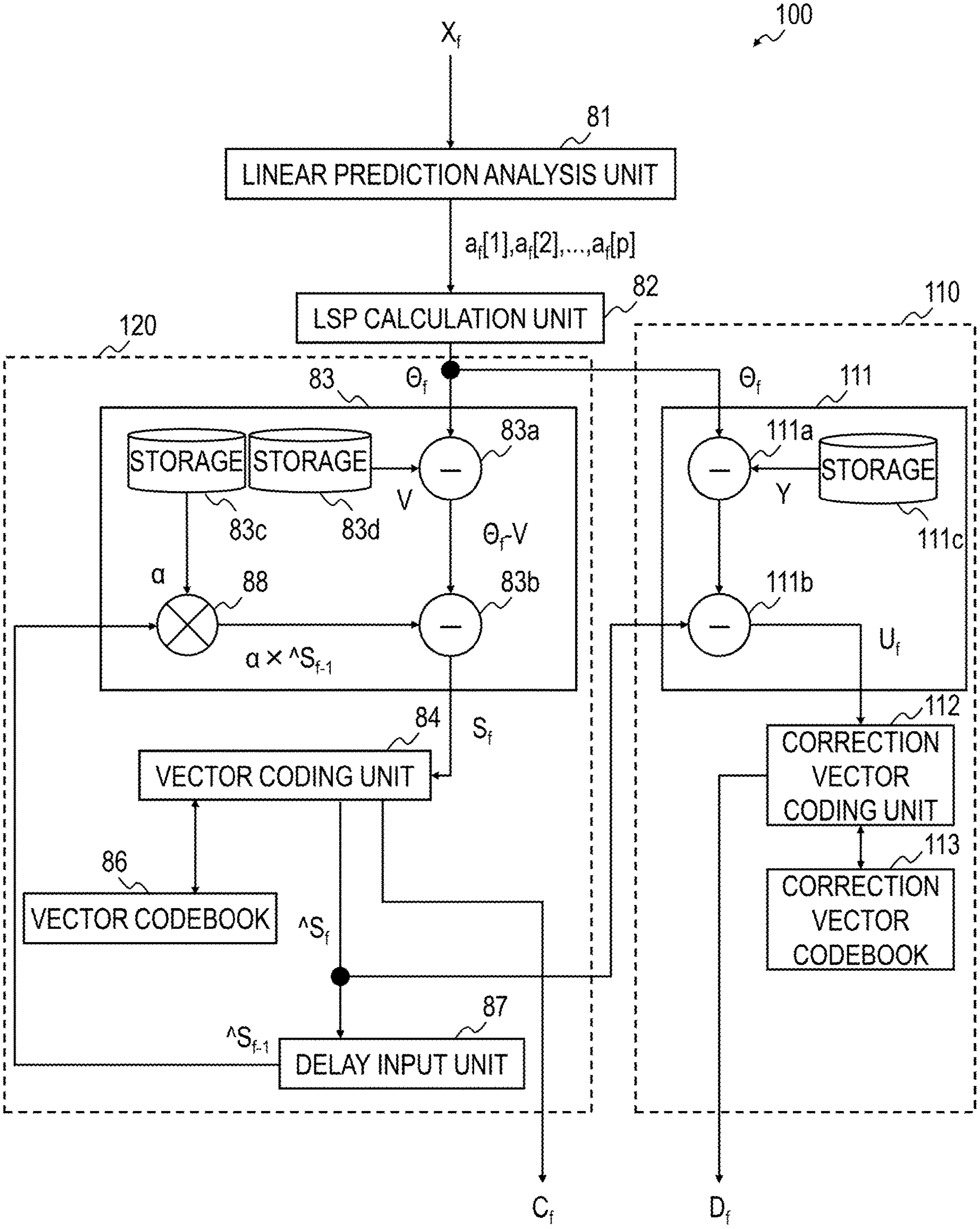
FIG. 3 is a functional block diagram of a linear prediction coefficient coding device according to a first embodiment.
Figure 4:
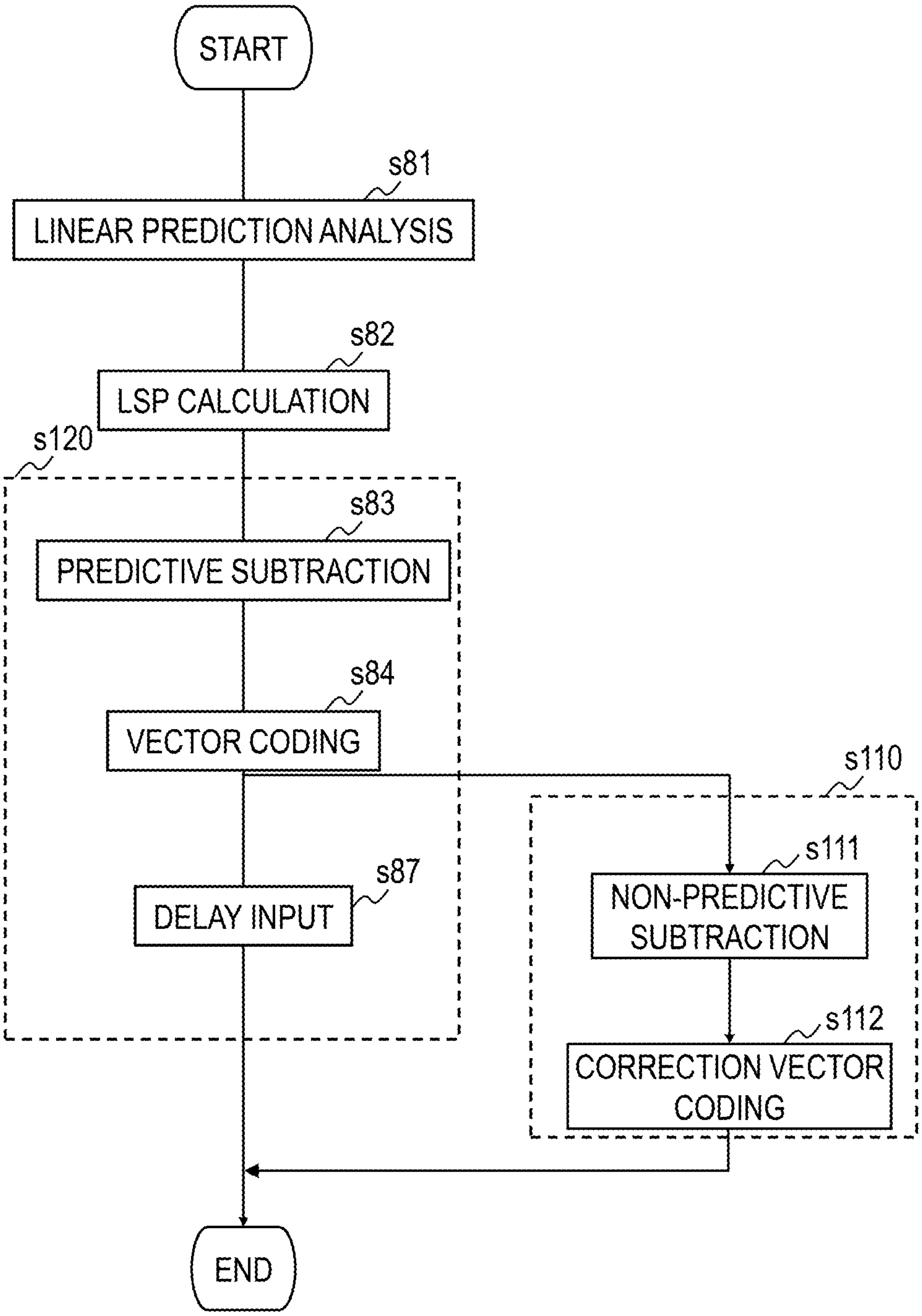
FIG. 4 is a diagram depicting an example of the processing flow of the linear prediction coefficient coding device according to the first embodiment.

Linear Prediction Coefficient Coding Device 100 According to the First Embodiment FIG. 3 depicts a functional block diagram of a linear prediction coefficient coding device 100 according to the first embodiment, and FIG. 4 depicts an example of the processing flow thereof.

The linear prediction coefficient coding device 100 includes a linear prediction analysis unit 81, an LSP calculation unit 82, a predictive coding unit 120, and a non-predictive coding unit 110. The processing which is performed in the linear prediction analysis unit 81 and the LSP calculation unit 82 is the same as that described in the existing technology and corresponds to s81 and s82 of FIG. 4.

The linear prediction coefficient coding device 100 receives a sound signal $X_f$, obtains an LSP code $C_f$ and a correction LSP code $D_f$, and outputs the LSP code $C_f$ and the correction LSP code $D_f$. The codes output from the linear prediction coefficient coding device 100 are input to a linear prediction coefficient decoding device 200. Incidentally, if an LSP parameter vector $\Theta_f=(\theta_f[1], \theta_f[2], \ldots, \theta_f[p])^T$ derived from the sound signal $X_f$ is generated by another device and the input of the linear prediction coefficient coding device 100 is the LSP parameter vector $\Theta_f$, the linear prediction coefficient coding device 100 does not have to include the linear prediction analysis unit 81 and the LSP calculation unit 82.

<Predictive Coding Unit 120>

The predictive coding unit 120 includes a predictive subtraction unit 83, a vector coding unit 84, a vector codebook 86, and a delay input unit 87, and the processing which is performed in each unit is the same as that described in the existing technology. The processing which is performed in the predictive subtraction unit 83, the vector coding unit 84, and the delay input unit 87 corresponds to s83 to s87, respectively, of FIG. 4. However, the vector coding unit 84 outputs the quantization differential vector $^\wedge S_f$ not only to the delay input unit 87, but also to the non-predictive coding unit 110.

The predictive coding unit 120 receives the LSP parameter vector $\Theta_f$, codes a differential vector $S_f$ formed of differentials between the LSP parameter vector $\Theta_f$ and a prediction vector containing at least a prediction based on a past frame, obtains an LSP code $C_f$ and a quantization differential vector $^\wedge S_f$ corresponding to the LSP code $C_f$ (s120), and outputs the LSP code $C_f$ and the quantization differential vector $^\wedge S_f$. Incidentally, the quantization differential vector $^\wedge S_f$ corresponding to the LSP code $C_f$ is a vector formed of quantization values corresponding to the element values of the differential vector $S_f$.

Here, the prediction vector containing at least a prediction based on a past frame is, for example, a vector $V+\alpha\times{}^\wedge S_{f-1}$ obtained by adding a predetermined predictive mean vector V and a vector obtained by multiplying each element of a quantization differential vector (a preceding-frame quantization differential vector) $^\wedge S_{f-1}$ of the immediately preceding frame by predetermined $\alpha$. In this example, the vector representing a prediction based on a past frame, the prediction contained in the prediction vector, is $\alpha\times{}^\wedge S_{f-1}$ which is $\alpha$ times as long as the preceding-frame quantization differential vector $^\wedge S_{f-1}$.

Incidentally, since the predictive coding unit 120 does not need any input from the outside other than the LSP parameter vector $\Theta_f$, it can be said that the predictive coding unit 120 obtains the LSP code $C_f$ by coding the LSP parameter vector $\Theta_f$.

Moreover, though a predictive quantization LSP parameter vector $^\wedge\Theta_f$ is not generated in the predictive coding unit 120, it can be said that the predictive quantization LSP parameter vector $^\wedge\Theta_f$ obtained by quantizing the elements of the LSP parameter vector $\Phi_f$ in the predictive coding unit 120 is what is obtained by adding the prediction vector $V+\alpha\times{}^\wedge S_{f-1}$ to the quantization differential vector $^\wedge S_f$. That is, the predictive quantization LSP parameter vector is $^\wedge\Phi_f={}^\wedge S_f+V+\alpha\times{}^\wedge S_{f-1}$. Furthermore, a quantization error vector in the predictive coding unit 120 is $\Theta_f-{}^\wedge\Theta_f=\Theta_f-({}^\wedge S_f+V+\alpha\times{}^\wedge S_{f-1})$.

<Non-Predictive Coding Unit 110>

The non-predictive coding unit 110 includes a non-predictive subtraction unit 111, a correction vector coding unit 112, and a correction vector codebook 113.

The non-predictive coding unit 110 receives the LSP parameter vector $\Theta_f$ and the quantization differential vector $^\wedge S_f$, and obtains a correction LSP code $D_f$ by coding a correction vector which is a differential between the LSP parameter vector $\Phi_f$ and the quantization differential vector $^\wedge S_f$ and outputs the correction LSP code $D_f$ (s110).

Here, since the correction vector is $\Theta_f-{}^\wedge S_f$ and the quantization error vector of the predictive coding unit 120 is $\Theta_f-{}^\wedge\Theta_f=\Theta_f-({}^\wedge S_f+V+\alpha\lambda{}^\wedge S_{f-1})$, the correction vector is what is obtained by adding the quantization error vector $\Theta_f-{}^\wedge\Theta_f$ of the predictive coding unit 120, the predictive mean vector V, and $\alpha\times{}^\wedge S_{f-1}$ which is the preceding-frame quantization differential vector multiplied by $\alpha$. That is, it can be said that the non-predictive coding unit 110 obtains the correction LSP code $D_f$ by coding what is obtained by adding the quantization error vector $\Theta_f-{}^\wedge\Theta_f$ and the prediction vector $V+\alpha\times{}^\wedge S_{f-1}$.

Any one of the well-known coding methods may be used for coding the correction vector $\Theta_f-{}^\wedge S_f$; in the following description, a method of vector quantizing what is obtained by subtracting a non-predictive mean vector Y from the correction vector $\Theta_f-{}^\wedge S_f$ will be described. Incidentally, in the following description, $U_f=\Theta_f-Y-{}^\wedge S_f$ that is a vector obtained by subtracting the non-predictive mean vector Y from the correction vector $\Theta_f-{}^\wedge S_f$ is referred to as a correction vector for descriptive purposes.

Hereinafter, processing of each unit will be described.

<Non-Predictive Subtraction Unit 111>

The non-predictive subtraction unit 111 is formed of, for example, a storage 111*c* storing the non-predictive mean vector Y and subtraction units 111*a* and 111*b*.

The non-predictive subtraction unit 111 receives the LSP parameter vector $\Theta_f=(\theta_f[1], \theta_f[2], \ldots, \theta_f[p])^T$ output from the LSP calculation unit 82 and the quantization differential vector $\hat{}S_f$.

The non-predictive subtraction unit 111 generates a correction vector $U_f=\Theta_f-Y-\hat{}S_f$ that is a vector obtained by subtracting the quantization differential vector $\hat{}S_f=(\hat{}s_f[1], \hat{}s_f[2], \ldots, \hat{}s_f[p])^T$ and the non-predictive mean vector $Y=(y[1], y[2], \ldots, y[p])^T$ from the LSP parameter vector $\Theta_f=(\theta_f[1], \theta_f[2], \ldots, \theta_f[p])^T$ (s111), and outputs the correction vector $U_f$.

Incidentally, in FIG. 3, by using the two subtraction units 111*a* and 111*b*, first, after the non-predictive mean vector Y stored in the storage 111*c* is subtracted from the LSP parameter vector $\Phi_f$ in the subtraction unit 111*a*, the quantization differential vector $\hat{}S_f$ is subtracted in the subtraction unit 111*b*, but these subtractions may be performed the other way around. Alternatively, the correction vector $U_f$ may be generated by subtracting a vector obtained by adding the non-predictive mean vector Y and the quantization differential vector $\hat{}S_f$ from the LSP parameter vector $\Phi_f$.

Incidentally, the non-predictive mean vector Y is a predetermined vector and simply has to be obtained in advance from, for example, a sound signal for learning. For example, in the corresponding linear prediction coefficient coding device 100, by using a sound signal picked up in the same environment (for instance, the same speaker, sound pick-up device, and place) as the sound signal to be coded as an input sound signal for learning, differentials between the LSP parameter vectors and the quantization differential vectors for the LSP parameter vectors of many frames are obtained, and the average of the differentials is used as the non-predictive mean vector.

<Correction Vector Codebook 113>

In the correction vector codebook 113, candidate correction vectors and correction vector codes corresponding to the candidate correction vectors are stored.

<Correction Vector Coding Unit 112>

The correction vector coding unit 112 receives the correction vector $U_f$, codes the correction vector $U_f$, obtains the correction LSP code $D_f$ (s112), and outputs the correction LSP code $D_f$. For example, the correction vector coding unit 112 searches for a candidate correction vector closest to the correction vector $U_f$ from the plurality of candidate correction vectors stored in the correction vector codebook 113 and outputs the correction vector code corresponding to that candidate correction vector as the correction LSP code $D_f$. Incidentally, although actual generation thereof does not have to be performed in the correction vector coding unit 112, the following description will be given on the assumption that a candidate correction vector closest to the correction vector $U_f$ is a quantized correction vector $\hat{}U_f$.

Incidentally, as described earlier, since the correction vector contains at least the preceding-frame quantization differential vector $\hat{}S_{f-1}$ which is the prediction of the predictive coding unit 120 based on the preceding frame, it can be said that the correction vector coding unit 112 codes at least the prediction of the predictive coding unit 120 based on the preceding frame.

Moreover, although generation thereof does not have to be performed in the non-predictive coding unit 110, a non-predictive quantization LSP parameter vector $\hat{}\Phi_f$ obtained by quantizing the elements of the LSP parameter vector $\Theta_f$ in the non-predictive coding unit 110 is what is obtained by adding the non-predictive mean vector Y, the quantization differential vector $\hat{}S_f$, and the quantized correction vector $\hat{}U_f$. That is, $\hat{}\Phi_f=\hat{}U_f+Y+\hat{}S_f$ holds.

Linear Prediction Coefficient Decoding Device 200 According to the First Embodiment Hereinafter, differences from the existing example will be mainly described.

Figure 5:
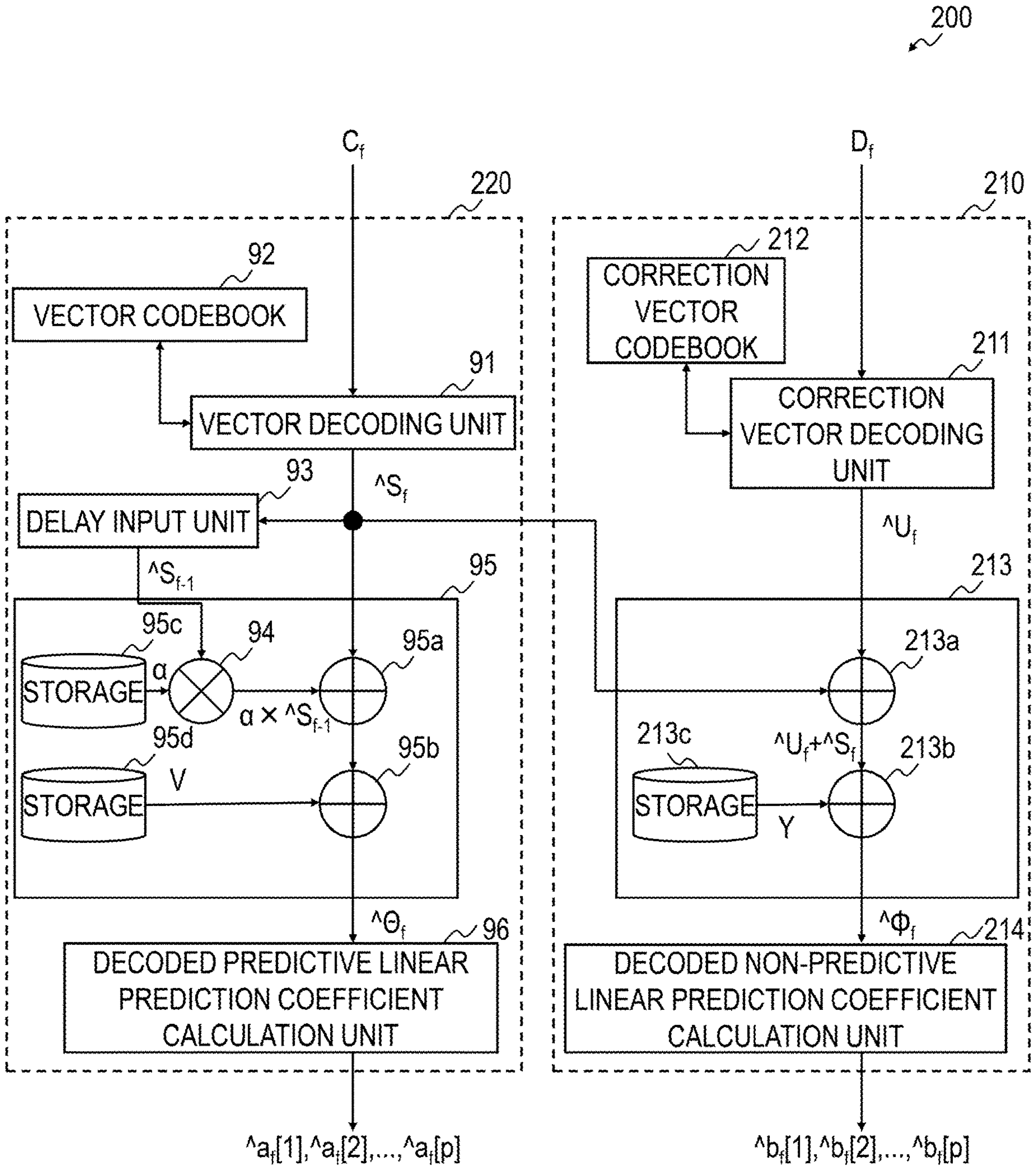
FIG. 5 is a functional block diagram of a linear prediction coefficient decoding device according to the first embodiment.
Figure 6:
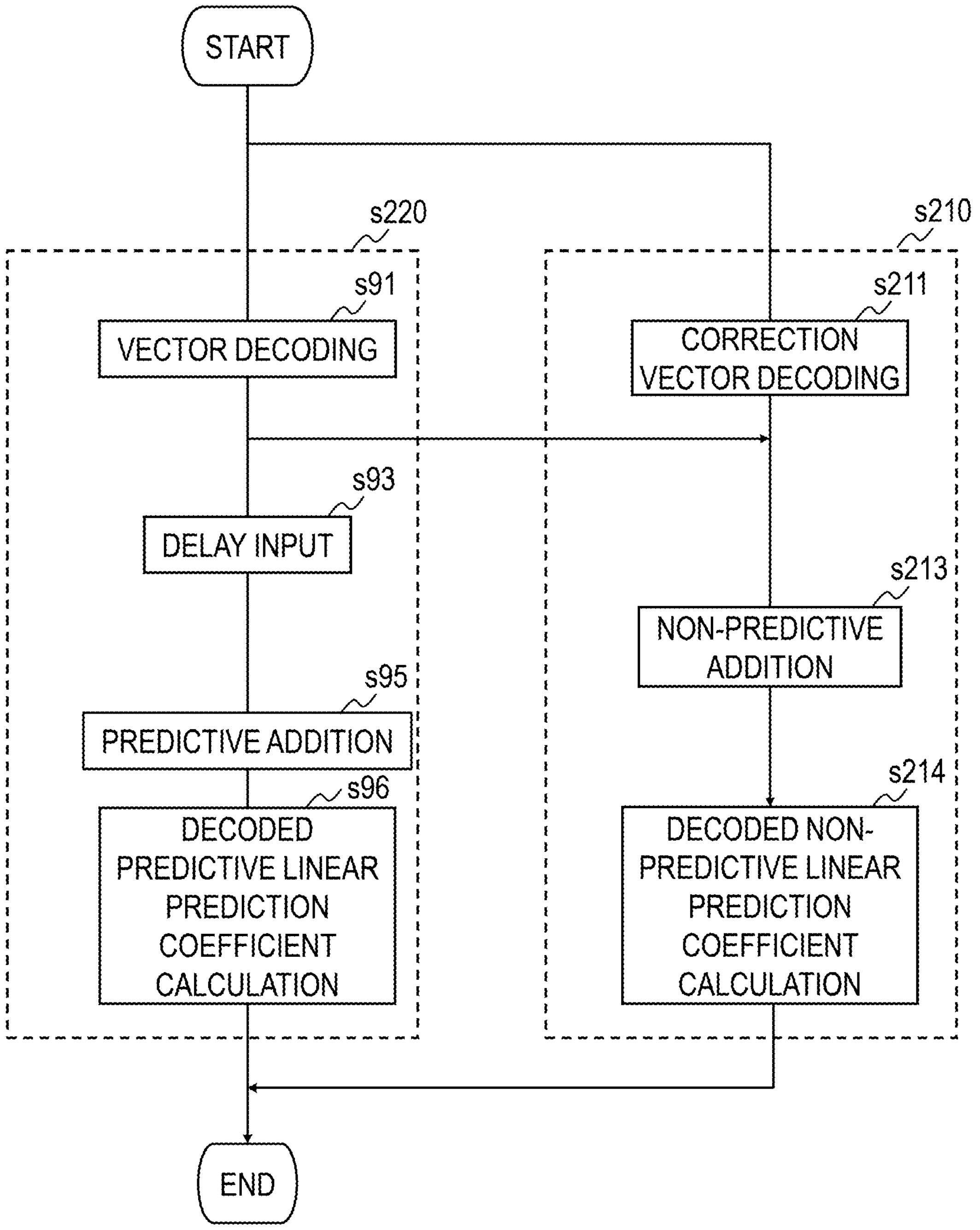
FIG. 6 is a diagram depicting an example of the processing flow of the linear prediction coefficient decoding device according to the first embodiment.

FIG. 5 depicts a functional block diagram of the linear prediction coefficient decoding device 200 according to the first embodiment, and FIG. 6 depicts an example of the processing flow thereof.

The linear prediction coefficient decoding device 200 includes a predictive decoding unit 220 and a non-predictive decoding unit 210.

The linear prediction coefficient decoding device 200 receives the LSP code $C_f$ and the correction LSP code $D_f$, generates a decoded predictive LSP parameter vector $\hat{}\Theta_f=(\hat{}\theta_f[1], \hat{}\theta_f[2], \ldots, \hat{}\theta_f[p])$ and a decoded non-predictive LSP parameter vector $\hat{}\Phi_f=(\hat{}\phi_f[1], \hat{}\phi_f[2], \ldots, \hat{}\phi f[p])$, and outputs the decoded predictive LSP parameter vector $\hat{}\Theta_f$ and the decoded non-predictive LSP parameter vector $\hat{}\Phi_f$. Moreover, when necessary, the linear prediction coefficient decoding device 200 generates decoded predictive linear prediction coefficients $\hat{}a_f[1], \hat{}a_f[2], \ldots, \hat{}a_f[p]$ and decoded non-predictive linear prediction coefficients $\hat{}b_f[1], \hat{}b_f[2], \ldots, \hat{}b_f[p]$ which are obtained by converting the decoded predictive LSP parameters $\hat{}\theta_f[1], \hat{}\theta_f[2], \ldots, \hat{}\theta_f[p]$ and the decoded non-predictive LSP parameters $\hat{}\phi_f[1], \hat{}\phi_f[2], \ldots, \hat{}\phi_f[p]$ respectively into linear prediction coefficients, and outputs the decoded predictive linear prediction coefficients $\hat{}a_f[1], \hat{}a_f[2], \ldots, \hat{}a_f[p]$ and the decoded non-predictive linear prediction coefficients $\hat{}b_f[1], \hat{}b_f[2], \ldots, \hat{}b_f[p]$.

<Predictive Decoding Unit 220>

The predictive decoding unit 220 has a configuration similar to that of the linear prediction coefficient decoding device 90 of the existing technology, and the predictive decoding unit 220 includes a vector codebook 92, a vector decoding unit 91, a delay input unit 93, and a predictive addition unit 95 and, when necessary, also includes a decoded predictive linear prediction coefficient calculation unit 96. The processing which is performed in the vector decoding unit 91, the delay input unit 93, the predictive addition unit 95, and the decoded predictive linear prediction coefficient calculation unit 96 corresponds to s91 to s96, respectively, of FIG. 6.

The predictive decoding unit 220 receives the LSP code $C_f$, obtains a decoded differential vector $\hat{}S_f$ by decoding the LSP code $C_f$, generates a decoded predictive LSP parameter vector $\hat{}\Theta_f=(\hat{}\theta_f[1], \hat{}\theta_f[2], \ldots, \hat{}\theta_f[p])$ formed of decoded values $\hat{}\theta_f[1], \hat{}\theta_f[2], \ldots, \hat{}\theta_f[p]$ of the elements of the LSP parameter vector by adding the decoded differential vector $\hat{}S_f$ and a prediction vector containing at least a prediction based on a past frame (s220), and outputs the decoded predictive LSP parameter vector $\hat{}\Phi_f$. When necessary, the predictive decoding unit 220 further converts the decoded predictive LSP parameter vector $\hat{}\Theta_f$ into decoded predictive linear prediction coefficients $\hat{}a_f[1], \hat{}a_f[2], \ldots, \hat{}a_f[p]$ (s220) and outputs the decoded predictive linear prediction coefficients $\hat{}a_f[1], \hat{}a_f[2], \ldots, \hat{}a_f[p]$.

In the present embodiment, the prediction vector is a vector $(V+\alpha\times\hat{}S_{f-1})$ obtained by adding the predetermined predictive mean vector V and what is obtained by multiplying the decoded differential vector $\hat{}S_{f-1}$ of a past frame by a factor of $\alpha$.

Incidentally, the vector decoding unit 91 outputs the decoded differential vector $\hat{}S_f$ also to a non-predictive addition unit 213 of the non-predictive decoding unit 210 in addition to the delay input unit 93 and the predictive addition unit 95.

<Non-Predictive Decoding Unit 210>

The non-predictive decoding unit 210 includes a correction vector codebook 212, a correction vector decoding unit 211, and the non-predictive addition unit 213 and, when necessary, also includes a decoded non-predictive linear prediction coefficient calculation unit 214.

To the non-predictive decoding unit 210, the correction LSP code $D_f$ and the decoded differential vector $\hat{S}_f$ are input. The non-predictive decoding unit 210 obtains a decoded correction vector $\hat{U}_f=(\hat{u}_f[1], \hat{u}_f[2], \ldots, \hat{u}_f[p])^T$ by decoding the correction LSP code $D_f$. The non-predictive decoding unit 210 further generates a decoded non-predictive LSP parameter vector $\hat{\Theta}_f=(\hat{\phi}_f[1], \hat{\phi}_f[2], \ldots, \hat{\phi}_f[p])$ formed of decoded values $\hat{\phi}_f[1], \hat{\phi}_f[2], \ldots, \hat{\phi}_f[p]$ of the elements of the LSP parameter vector of the present frame by adding at least the decoded differential vector $\hat{S}_f$ to the decoded correction vector $\hat{U}_f$ (s210) and outputs the decoded non-predictive LSP parameter vector $\hat{\Phi}_f$. When necessary, the non-predictive decoding unit 210 further converts the decoded non-predictive LSP parameter vector $\hat{\Phi}_f$ into decoded non-predictive linear prediction coefficients $\hat{b}_f[1], \hat{b}_f[2], \ldots, \hat{b}_f[p]$ (s210) and outputs the decoded non-predictive linear prediction coefficients $\hat{b}_f[1], \hat{b}_f[2], \ldots, \hat{b}_f[p]$.

In the present embodiment, the decoded non-predictive LSP parameter vector $\hat{\Phi}_f$ is a vector obtained by adding the decoded differential vector $\hat{S}_f$ obtained by decoding the LSP code $C_f$ and the predetermined non-predictive mean vector Y to the decoded correction vector $\hat{U}_f$ obtained by decoding the correction LSP code $D_f$. That is, in the non-predictive decoding unit 210, the decoded vector $\hat{\Phi}_f$ of the LSP parameter vector of the present frame is obtained only from the codes input in the present frame.

Hereinafter, the details of processing of each unit will be described.

<Correction Vector Codebook 212>

The correction vector codebook 212 stores the information with the same contents as those of the correction vector codebook 113 in the linear prediction coefficient coding device 100. That is, in the correction vector codebook 212, candidate correction vectors and correction vector codes corresponding to the candidate correction vectors are stored.

<Correction Vector Decoding Unit 211>

The correction vector decoding unit 211 receives the correction LSP code $D_f$, obtains the decoded correction vector $\hat{U}_f$ by decoding the correction LSP code $D_f$ (s211), and outputs the decoded correction vector $\hat{U}_f$. For example, the correction vector decoding unit 211 searches for a correction vector code corresponding to the correction LSP code $D_f$ input to the linear prediction coefficient decoding device 200 from the plurality of correction vector codes stored in the correction vector codebook 212 and outputs a candidate correction vector corresponding to the correction vector code obtained by the search as the decoded correction vector $\hat{U}_f$.

<Non-Predictive Addition Unit 213>

The non-predictive addition unit 213 is formed of, for example, a storage 213*c* storing a non-predictive mean vector Y and addition units 213*a* and 213*b*.

The non-predictive addition unit 213 receives the decoded correction vector $\hat{U}_f$ and the decoded differential vector $\hat{S}_f$. The non-predictive addition unit 213 generates a decoded non-predictive LSP parameter vector $\hat{\Phi}_f=\hat{U}_f+Y+\hat{S}_f=(\hat{\phi}_f[1], \hat{\phi}_f[2], \ldots, \hat{\phi}_f[p])$ obtained by adding the decoded correction vector $\hat{U}_f$, the decoded differential vector $\hat{S}_f$, and the non-predictive mean vector Y stored in the storage 213*c* (s213) and outputs the decoded non-predictive LSP parameter vector $\hat{\Phi}_f$. Incidentally, in FIG. 5, by using the two addition units 213*a* and 213*b*, first, after the decoded differential vector $\hat{S}_f$ is added to the decoded correction vector $\hat{U}_f$ in the addition unit 213*a*, the non-predictive mean vector Y stored in the storage 213*c* is added in the addition unit 213*b*, but these additions may be performed the other way around. Alternatively, the decoded non-predictive LSP parameter vector $\hat{\Phi}_f$ may be generated by adding a vector obtained by adding the non-predictive mean vector Y and the decoded differential vector $\hat{S}_f$ to the decoded correction vector $\hat{U}_f$.

Incidentally, it is assumed that the non-predictive mean vector Y used here is the same as the non-predictive mean vector Y used in the non-predictive subtraction unit 111 of the above-described linear prediction coefficient coding device 100.

<Decoded Non-Predictive Linear Prediction Coefficient Calculation Unit 214>

The decoded non-predictive linear prediction coefficient calculation unit 214 receives the decoded non-predictive LSP parameter vector $\hat{\Phi}_f$. The decoded non-predictive linear prediction coefficient calculation unit 214 converts the decoded non-predictive LSP parameter vector $\hat{\Phi}_f$ into decoded non-predictive linear prediction coefficients $\hat{b}_f[1], \hat{b}_f[2], \ldots, \hat{b}_f[p]$ (s214) and outputs the decoded non-predictive linear prediction coefficients $\hat{b}_f[1], \hat{b}_f[2], \ldots, \hat{b}_f[p]$.

Effect of the First Embodiment

With the linear prediction coefficient decoding device of the first embodiment, even when the decoded differential vector $\hat{S}_{f-1}$ cannot be decoded correctly due to a transmission error occurred in an LSP code $C_{f-1}$ of an f-1th frame, since the decoded non-predictive LSP parameter vector $\hat{\Phi}_f$ which is a decoded value of the LSP parameter vector which does not depend on the decoded differential vector $\hat{S}_{f-1}$ is obtained in the non-predictive decoding unit 210, it is possible to prevent the transmission error in the LSP code $C_{f-1}$ of the f-1th frame from affecting the decoded non-predictive LSP parameter vector $\hat{\Phi}_f$ of an fth frame. For example, when the non-predictive quantization LSP parameter vector/decoded non-predictive LSP parameter vector $\hat{\Phi}_f$ is used as an LSP parameter vector which is used in variable-length coding/decoding depending on the amplitude values forming a spectral envelope which is determined from an LSP parameter vector, even when a correct decoded non-predictive LSP parameter vector $\hat{\Phi}_f$ cannot be obtained in the f-Ith frame and variable-length decoding cannot be performed correctly, a correct decoded non-predictive LSP parameter vector $\hat{\Phi}_f$ is obtained in the fth frame and variable-length decoding can be performed correctly.

Incidentally, since the correction vector does not have to be quantized accurately to such an extent that the LSP parameter vector is quantized (in such a way that a quantization error becomes smaller), the number of types of candidate correction vectors prepared in the correction vector codebook 113 may be small. For example, the bit length of the correction vector code is 2-bit, and, in the correction vector codebook 113, four types of candidate correction vectors corresponding to four types of correction vector codes ("00" "01" "10" "11") are stored.

This makes it possible to reduce the number of types of candidate correction vectors prepared in the correction vector codebook and thereby assign a code with a small code amount. As a result, with an increase in a small code amount, it is possible to implement coding and decoding in which less distortion occurs than in the existing example.

<Modification>

In the present embodiment, LSP parameters are described, but other coefficients may be used as long as the coefficients are coefficients which are convertible into linear prediction coefficients of more than one order. The above may be applied to PARCOR coefficients, coefficients obtained by transforming the LSP parameters or PARCOR coefficients, and linear prediction coefficients themselves. All of these coefficients can be converted into one another in the technical field of speech coding, and the effect of the first embodiment can be obtained by using any one of these coefficients. Incidentally, the LSP code $C_f$ or a code corresponding to the LSP code $C_f$ is also referred to as a first code and the predictive coding unit is also referred to as a first coding unit. Likewise, the correction LSP code or a code corresponding to the correction LSP code is also referred to as a second code and the non-predictive coding unit is also referred to as a second coding unit. Moreover, the decoded predictive LSP parameter vector $\hat{\Theta}_f$ or a vector corresponding to the decoded predictive LSP parameter vector $\hat{\Theta}_f$ is also referred to as a first decoded vector and the predictive decoding unit is also referred to as a first decoding unit. Furthermore, the decoded non-predictive LSP parameter vector $\hat{\Phi}_f$ or a vector corresponding to the decoded non-predictive LSP parameter vector $\hat{\Phi}_f$ is also referred to as a second decoded vector and the non-predictive decoding unit is also referred to as a second decoding unit.

In the present embodiment, only one frame is used as a "past frame", but, if necessary, two frames or more may be used as appropriate.

Second Embodiment

Differences from the first embodiment will be mainly described.

In the present embodiment, it is determined whether or not to code a correction vector and decode a correction LSP code by using the magnitude of a change in the height difference in the waves of the amplitude of a spectral envelope, in other words, the peak-to-valley height of the spectral envelope.

If LSP parameters are coded by the same code amount irrespective of the magnitude of a change in the height difference in the waves of the amplitude of a spectral envelope, a quantization error observed when a change in the height difference in the waves of the amplitude of a spectral envelope is great is larger than a quantization error observed when a change in the height difference of the waves of the amplitude of a spectral envelope is small. Thus, a linear prediction coefficient coding device executes the correction vector coding unit only when a quantization error in LSP is deemed to be large and outputs a correction LSP code $D_f$ and a linear prediction coefficient decoding device decodes the correction LSP code $D_f$, whereby it is possible to perform coding and decoding processing which suffers less reduction in the sound quality caused by a transmission error in a code than in the existing technology while reducing the code amount as a whole compared to the first embodiment.

Figure 7:
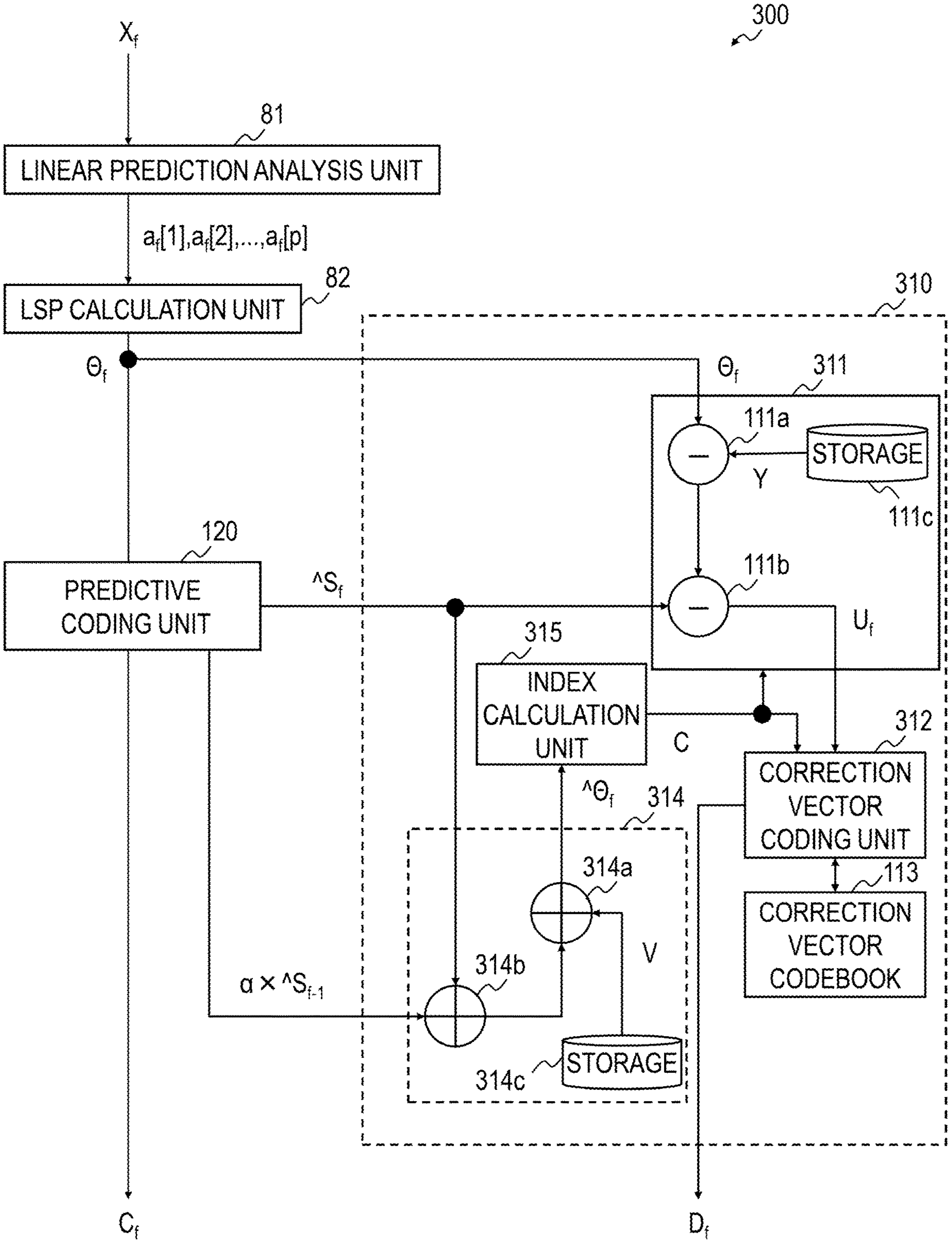
FIG. 7 is a functional block diagram of a linear prediction coefficient coding device according to a second embodiment.
Figure 8:
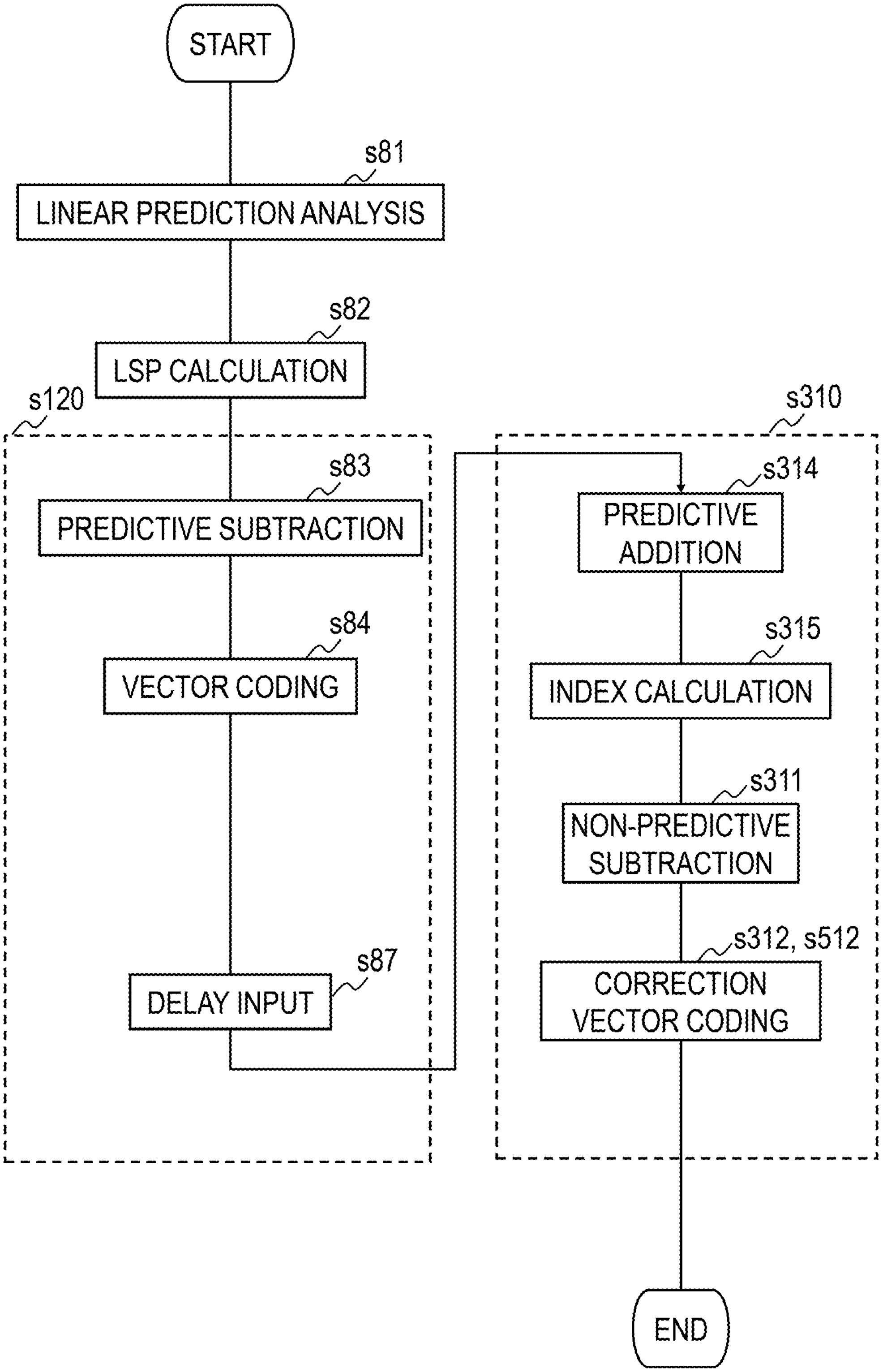
FIG. 8 is a diagram depicting an example of the processing flow of the linear prediction coefficient coding device according to the second and third embodiments.

Linear Prediction Coefficient Coding Device 300 According to the Second Embodiment FIG. 7 depicts a functional block diagram of a linear prediction coefficient coding device 300 according to the second embodiment, and FIG. 8 depicts an example of the processing flow thereof.

The linear prediction coefficient coding device 300 of the second embodiment includes a non-predictive coding unit 310 in place of the non-predictive coding unit 110. As is the case with the linear prediction coefficient coding device 100 of the first embodiment, if LSP parameters θ derived from a sound signal $X_f$ are generated by another device and the input of the linear prediction coefficient coding device 300 is the LSP parameters $\theta_f[1], \theta_f[2], \ldots, \theta_f[p]$, the linear prediction coefficient coding device 300 does not have to include the linear prediction analysis unit 81 and the LSP calculation unit 82.

The non-predictive coding unit 310 includes a non-predictive subtraction unit 311, a correction vector coding unit 312, the correction vector codebook 113, a predictive addition unit 314, and an index calculation unit 315. The difference lies in that it is determined whether or not to perform subtraction processing in the non-predictive subtraction unit 311 and perform coding processing in the correction vector coding unit 312 depending on the calculation result of the index calculation unit 315.

Incidentally, the predictive coding unit 120 outputs a vector $\alpha \times \hat{S}_{f-1}$, which is an output value of the multiplication unit 88, in addition to a quantization differential vector $\hat{S}_f$.

<Predictive Addition Unit 314>

The predictive addition unit 314 is formed of, for example, a storage 314*c* storing a predictive mean vector V and addition units 314*a* and 314*b*.

The predictive addition unit 314 receives the quantization differential vector $\hat{S}_f$ of the present frame and the vector $\alpha \times \hat{S}_{f-1}$ obtained by multiplying the preceding-frame quantization differential vector $\hat{S}_{f-1}$ by a predetermined coefficient α.

The predictive addition unit 314 generates a predictive quantization LSP parameter vector $\hat{\Theta}_f(=\hat{S}_f+V+\alpha\hat{S}_{f-1})=(\hat{\theta}_f[1], \hat{\theta}_f[2], \ldots, \hat{\theta}_f[p])^T$ that is a vector obtained by adding the quantization differential vector $\hat{S}_f$, the predictive mean vector V, and the vector $\alpha \times \hat{S}_{f-1}$ (s314) and outputs the predictive quantization LSP parameter vector $\hat{\Theta}$f.

In FIG. 7, by using the two addition units 314*a* and 314*b*, first, after the vector $\alpha \times \hat{S}_{f-1}$ is added to the quantization differential vector $\hat{S}_f$ of the present frame in the addition unit 314*b*, the predictive mean vector V is added in the addition unit 314*a*, but the above may be performed the other way around. Alternatively, the predictive quantization LSP parameter vector $\hat{\Phi}_f$ may be generated by adding a vector obtained by adding the vector $\alpha \times \hat{S}_{f-1}$ and the predictive mean vector V to the quantization differential vector $\hat{S}_f$.

Incidentally, since both the quantization differential vector $\hat{S}_f$ of the present frame and the vector $\alpha \times \hat{S}_{f-1}$ obtained by multiplying the preceding-frame quantization differential vector $\hat{S}_{f-1}$ by the predetermined coefficient α, the quantization differential vector $\hat{S}_f$ and the vector $\alpha \times \hat{S}_{f-1}$ being input to the predictive addition unit 314, are generated also in the predictive coding unit 120 and the predictive mean vector V stored in the storage 314*c* in the predictive addition unit 314 is the same as the predictive mean vector V stored in the storage 83*d* in the predictive coding unit 120, a configuration may be adopted in which the predictive coding unit 120 generates the predictive quantization LSP parameter vector $\hat{\Theta}_f$ by performing the processing which is performed by the predictive addition unit 314 and outputs the predictive quantization LSP parameter vector $\hat{\Phi}_f$ to the non-predictive coding unit 310 and the predictive addition unit 314 is not provided in the non-predictive coding unit 310.

<Index Calculation Unit 315>

The index calculation unit 315 receives the predictive quantization LSP parameter vector $\hat{\Theta}_f$. By using the predictive quantization LSP parameter vector $\hat{\Theta}_f$, the index calculation unit 315 calculates an index Q commensurate with how high the peak-to-valley height of a spectral envelope is, the spectral envelope corresponding to the predictive quantization LSP parameter vector $\hat{\Theta}_f$, that is, the index Q which increases with an increase in the peak-to-valley of the spectral envelope and/or an index Q' commensurate with how short the peak-to-valley height of the spectral envelope is, that is, the index Q' which decreases with an increase in the peak-to-valley of the spectral envelope (s315). In accordance with the magnitude of the index Q and/or Q', the index calculation unit 315 outputs a control signal C to the correction vector coding unit 312 such that the correction vector coding unit 312 performs coding processing or performs coding processing using a predetermined bit number. Moreover, in accordance with the magnitude of the index Q and/or Q', the index calculation unit 315 outputs the control signal C to the non-predictive subtraction unit 311 such that the non-predictive subtraction unit 311 performs subtraction processing. Hereinafter, a method of generating the control signal C will be described.

In general, LSP parameters are a parameter sequence in a frequency domain having a correlation to a power spectral envelope of an input sound signal, and each value of the LSP parameters correlates with the frequency position of the extreme value of the power spectral envelope of the input sound signal. If the LSP parameters are assumed to be θ[1], θ[2], . . . , θ[p], the extreme value of the power spectral envelope is present in the frequency position between θ[i] and θ[i+1], and, the steeper the slope of a tangent around this extreme value is, the narrower the interval (that is, the value of (θ[i+1]−[i])) between 9[i] and θ[i+1] becomes. That is, the larger the height difference in the waves of the amplitude of the power spectral envelope is, the more unequal the interval between θ[i] and θ[i+1] becomes for each i, that is, the higher the variance of the intervals between the LSP parameters becomes; conversely, if there is almost no height difference in the waves of the power spectral envelope, the more equal the interval between θ[i] and θ[i+1] becomes for each i, that is, the lower the variance of the intervals between the LSP parameters becomes.

Thus, a large index corresponding to the variance of the intervals between the LSP parameters means a large change in the height difference of the waves of the amplitude of a power spectral envelope. Moreover, a small index corresponding to the minimum value of the intervals between the LSP parameters means a large change in the height difference of the waves of the amplitude of a power spectral envelope.

Since predictive quantization LSP parameters $\hat{\theta}_f[1]$, $\hat{\theta}_f[2]$, . . . , $\hat{\theta}_f[p]$ are what are obtained by quantizing the LSP parameters $\theta_f[1]$, $\theta_f[2]$, . . . , θ[p] and, if the LSP code $C_f$ is input to the linear predictive decoding device from the linear predictive coding device without error, the decoded predictive LSP parameters $\hat{\Theta}_f[1]$, $\hat{\Theta}_f[2]$, . . . , $\theta_f[p]$ are the same as the predictive quantization LSP parameters $\hat{\theta}_f[1]$, $\hat{\theta}_f[2]$, . . . , $\hat{\theta}_f[p]$, the predictive quantization LSP parameters $\hat{\theta}_f[1]$, $\hat{\theta}_f[2]$, . . . , $\hat{\theta}_f[p]$ and the decoded predictive LSP parameters $\hat{\theta}_f[1]$, $\hat{\theta}_f[2]$, . . . , $\hat{\theta}_f[p]$ also have the properties similar to those of the LSP parameters $\theta_f[1]$, $\theta_f[2]$, . . . , $\theta_f[p]$.

Thus, a value corresponding to the variance of the intervals between the predictive quantization LSP parameters $\theta_f[1]$, $\hat{\theta}_f[2]$, . . . , $\theta_f[p]$ can be used as the index Q which increases with an increase in the peak-to-valley of a spectral envelope, and the minimum value of the differentials ($\hat{\theta}_f[i+1]-\hat{\theta}_f[i]$) between the predictive quantization LSP parameters with adjacent orders, the predictive quantization LSP parameters of the predictive quantization LSP parameter vector $\hat{\Theta}_f=(\hat{\theta}_f[1], \hat{\theta}_f[2], \dots, \theta_f[p])$, can be used as the index Q' which decreases with an increase in the peak-to-valley of a spectral envelope.

The index Q which increases with an increase in the peak-to-valley of a spectral envelope is calculated by, for example, an index Q indicating the variance of the intervals between the predictive quantization LSP parameters which are the elements of the predictive quantization LSP parameter vector $\hat{\Theta}_f$, each having an order lower than or equal to a predetermined order T (T≤p), that is, $$\bar{\theta} = \frac{1}{(T-1)}\sum_{i}^{T-1}\left(\hat{\theta}_f[i+1]-\hat{\theta}_f[i]\right)$$

$$Q = \frac{1}{(T-1)}\sum_{i}^{T-1}\left(\bar{\theta}-\hat{\theta}_f[i+1]+\hat{\theta}_f[i]\right)^2$$

Moreover, the index Q' which decreases with an increase in the peak-to-valley of a spectral envelope is calculated by, for example, an index Q' indicating the minimum value of the interval between the predictive quantization LSP parameters with adjacent orders, the predictive quantization LSP parameters of the predictive quantization LSP parameter vector $\hat{\Theta}_f$ whose order is lower than or equal to a predetermined order T (T≤p), that is, $$Q' = \min_{i\in\{1,\dots,T-1\}}\left(\hat{\theta}_f[i+1]-\hat{\theta}_f[i]\right)$$

Alternatively, the index Q' is calculated by an index Q' indicating the minimum value of the interval between the prediction quantized LSP parameters with adjacent orders, the prediction quantized LSP parameters of the predictive quantization LSP parameter vector $\hat{\Theta}_f$, and the value of the lowest-order predictive quantization LSP parameter:

$$Q' = \min(\min_{i\in\{1,\dots,T-1\}}\left(\hat{\theta}_f[i+1]-\hat{\theta}_f[i], \hat{\theta}_f[i]]\right)$$

Since the LSP parameters are parameters present between 0 and π in sequence of order, the lowest-order predictive quantization LSP parameter $\hat{\theta}_f[1]$ in this formula means the interval ($\hat{\theta}_f[1]-0$) between $\hat{\theta}_f[1]$ and 0.

The index calculation unit 315 outputs, to the non-predictive subtraction unit 311 and the correction vector coding unit 312, the control signal C indicating that correction coding processing is performed if the peak-to-valley of the spectral envelope is above a predetermined standard, that is, in the above-described example, if (A-1) the index Q is larger than or equal to a predetermined threshold value Th1 and/or (B-1) the index Q' is smaller than or equal to a predetermined threshold value Th1'; otherwise, the index calculation unit 315 outputs, to the non-predictive subtraction unit 311 and the correction vector coding unit 312, the control signal C indicating that correction coding processing is not performed. Here, "in the case of (A-1) and/or (B-1)" is an expression including the following three cases: a case in which only the index Q is obtained and the condition (A-1) is satisfied, a case in which only the index Q' is obtained and the condition (B-1) is satisfied, and a case in which both the index Q and the index Q' are obtained and the conditions (A-1) and (B-1) are satisfied. It goes without saying that, even when a determination as to whether or not the condition (A-1) is satisfied is made, the index Q' may be obtained, and, even when a determination as to whether or not the condition (B-1) is satisfied is made, the index Q may be obtained. The same goes for "and/or" in the following description.

Moreover, the index calculation unit 315 may be configured such that the index calculation unit 315 outputs a positive integer (or a code representing a positive integer) representing a predetermined bit number as the control signal C in the case of (A-1) and/or (B-1); otherwise, the index calculation unit 315 outputs 0 as the control signal C.

Incidentally, when the non-predictive subtraction unit 311 is configured so as to perform subtraction processing if the non-predictive subtraction unit 311 receives the control signal C and the correction vector coding unit 312 is configured so as to perform coding processing if the correction vector coding unit 312 receives the control signal C, the index calculation unit 315 may be configured so as not to output the control signal C in cases other than the case (A-1) and/or (B-1).

<Non-Predictive Subtraction Unit 311>

The non-predictive subtraction unit 311 receives the control signal C, the LSP parameter vector $\Theta_f=(\theta_f[i], \Theta_f[2], \ldots, \Theta_f[p])^T$, and the quantization differential vector $\hat{S}_f$.

If the non-predictive subtraction unit 311 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A-1) and/or (B-1), the non-predictive subtraction unit 311 generates a correction vector $U_f=\Theta_f-Y-\hat{S}_f$ that is a vector obtained by subtracting the quantization differential vector $\hat{S}_{f-1}$ and the non-predictive mean vector $Y=(y[1], y[2], \ldots, y[p])^T$ from the LSP parameter vector $\Theta_f=(\theta_f[1], \theta_f[2], \ldots, \theta_f[p])^T$ (s311) and outputs the correction vector $U_f$.

<Correction Vector Coding Unit 312>

The correction vector coding unit 312 receives the control signal C and the correction vector $U_f$. If the correction vector coding unit 312 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A-1) and/or (B-1), the correction vector coding unit 312 obtains a correction LSP code $D_f$ by coding the correction vector $U_f$ (s312) and outputs the correction LSP code $D_f$. The coding processing itself of coding the correction vector $U_f$ is similar to that performed in the correction vector coding unit 112.

If the correction vector coding unit 312 receives the control signal C indicating that correction coding processing is not performed or 0 as the control signal C, in a word, if the peak-to-valley of the spectral envelope is not above the predetermined standard, that is, in the above-described example, in cases other than the case (A-1) and/or (B-1), the correction vector coding unit 312 does not perform coding of the correction vector $U_f$ and does not obtain and output a correction LSP code $D_f$.

Figure 9:
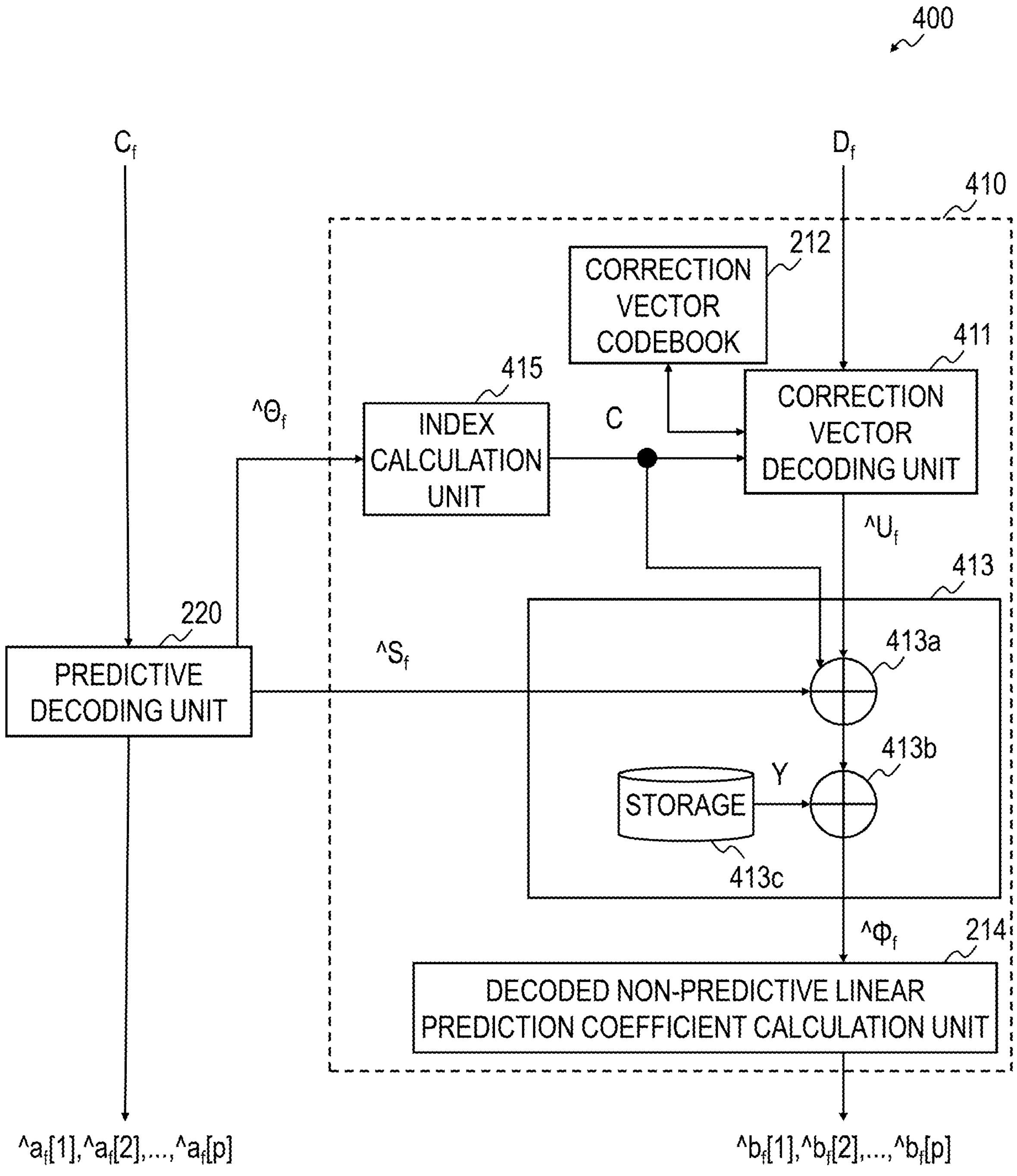
FIG. 9 is a functional block diagram of a linear prediction coefficient decoding device according to the second embodiment.
Figure 10:
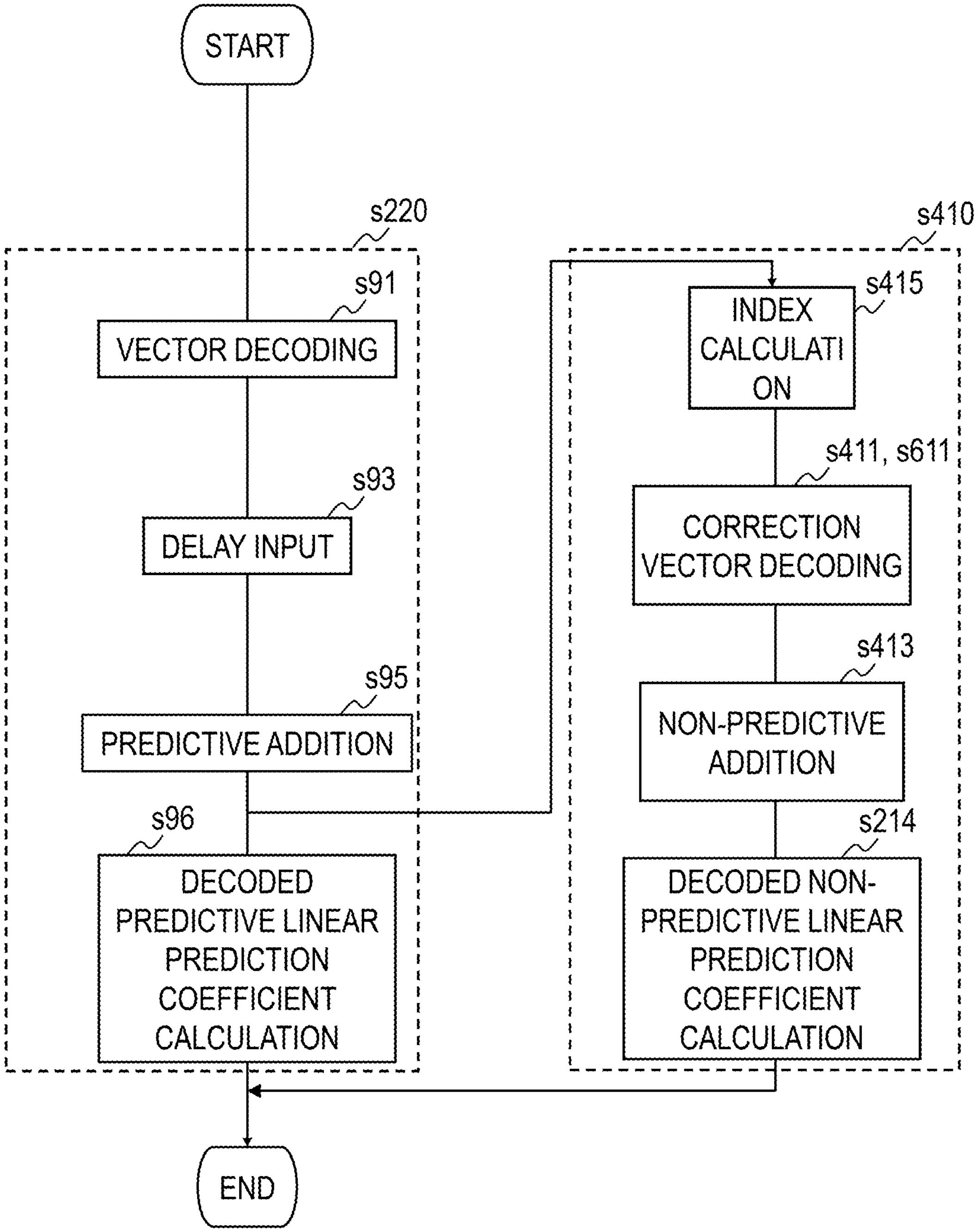
FIG. 10 is a diagram depicting an example of the processing flow of the linear prediction coefficient decoding device according to the second and third embodiments.

Linear Prediction Coefficient Decoding Device 400 According to the Second Embodiment FIG. 9 depicts a functional block diagram of a linear prediction coefficient decoding device 400 according to the second embodiment, and FIG. 10 depicts an example of the processing flow thereof.

The linear prediction coefficient decoding device 400 of the second embodiment includes a non-predictive decoding unit 410 in place of the non-predictive decoding unit 210.

The non-predictive decoding unit 410 includes the correction vector codebook 212, a correction vector decoding unit 411, a non-predictive addition unit 413, and an index calculation unit 415 and, when necessary, also includes the decoded non-predictive linear prediction coefficient calculation unit 214.

The difference lies in that it is determined whether or not to perform addition processing in the non-predictive addition unit 413 and perform decoding processing in the correction vector decoding unit 411 depending on the calculation result of the index calculation unit 415.

<Index Calculation Unit 415>

The index calculation unit 415 receives the decoded predictive LSP parameter vector $\hat{\Theta}_f$ and calculates an index Q commensurate with how high the peak-to-valley height of a spectral envelope is, the spectral envelope corresponding to the decoded predictive LSP parameter vector $\hat{\Theta}_f=(\hat{\theta}_f[1], \hat{\theta}_f[2], \ldots, \hat{\theta}_f[p])^T$, that is, the index Q which increases with an increase in the peak-to-valley of the spectral envelope and/or an index Q' commensurate with how short the peak-to-valley height of the spectral envelope is, that is, the index Q' which decreases with an increase in the peak-to-valley of the spectral envelope (s415). In accordance with the magnitude of the index Q and/or Q', the index calculation unit 415 outputs, to the correction vector decoding unit 411 and the non-predictive addition unit 413, a control signal C indicating that correction decoding processing is performed/not performed or a control signal C indicating that correction decoding processing is performed using a predetermined bit number. The indices Q and Q' are similar to those in the description of the index calculation unit 315 and simply have to be calculated in a manner similar to that used in the index calculation unit 315 by using the decoded predictive LSP parameter vector $\hat{\Theta}_f$ in place of the predictive quantization LSP parameter vector $\hat{\Theta}_f$.

The index calculation unit 415 outputs, to the non-predictive addition unit 413 and the correction vector decoding unit 411, the control signal C indicating that correction decoding processing is performed if the peak-to-valley of the spectral envelope is above the predetermined standard, that is, in the above-described example, if (A-1) the index Q is larger than or equal to the predetermined threshold value Th1 and/or (B-1) the index Q' is smaller than or equal to the predetermined threshold value Th1'; otherwise, the index calculation unit 415 outputs, to the non-predictive addition unit 413 and the correction vector decoding unit 411, the control signal C indicating that correction decoding processing is not performed.

Moreover, the index calculation unit 415 may be configured such that the index calculation unit 415 outputs a positive integer (or a code representing a positive integer) representing a predetermined bit number as the control signal C in the case of (A-1) and/or (B-1); otherwise, the index calculation unit 415 outputs 0 as the control signal C.

Incidentally, when the correction vector decoding unit 411 and the non-predictive addition unit 413 are configured so as to determine to perform correction decoding processing if the correction vector decoding unit 411 and the non-predictive addition unit 413 receive the control signal C, the index calculation unit 415 may be configured so as not to output the control signal C in cases other than the case (A-1) and/or (B-1).

<Correction Vector Decoding Unit 411>

The correction vector decoding unit 411 receives the correction LSP code $D_f$ and the control signal C. If the correction vector decoding unit 411 receives the control signal C indicating that correction decoding processing is performed or a positive integer (or a code representing a positive integer) as the control signal C, in a word, if the peak-to-valley of the spectral envelope is above the predetermined standard, that is, in the above-described example, in the case of (A-1) and/or (B-1), the correction vector decoding unit 411 obtains a decoded correction vector $\hat{U}_f$ by decoding the correction LSP code $D_f$ by referring to the correction vector codebook 212 (s411) and outputs the decoded correction vector $\hat{U}_f$. The decoding processing itself of decoding the correction LSP code $D_f$ is similar to that performed in the correction vector decoding unit 211.

If the correction vector decoding unit 411 receives the control signal C indicating that correction decoding processing is not performed or 0 as the control signal C, in a word, if the peak-to-valley of the spectral envelope is not above the predetermined standard, that is, in the above-described example, in cases other than the case (A-1) and/or (B-1), the correction vector decoding unit 411 does not perform decoding of the correction LSP code $D_f$ and does not obtain and output a decoded correction vector $\hat{U}_f$.

<Non-Predictive Addition Unit 413>

The non-predictive addition unit 413 is formed of, for example, a storage 413*c* storing a non-predictive mean vector Y and addition units 413*a* and 413*b*.

The non-predictive addition unit 413 receives the control signal C and the decoded differential vector $\hat{S}_f$. If the non-predictive addition unit 413 receives the control signal C indicating that correction decoding processing is performed or a positive integer (or a code representing a positive integer) as the control signal C, in a word, if the peak-to-valley of the spectral envelope is above the predetermined standard, in the case of (A-1) and/or (B-1), the non-predictive addition unit 413 further receives the decoded correction vector $\hat{U}_f$. Then, the non-predictive addition unit 413 generates a decoded non-predictive LSP parameter vector $\hat{\Phi}_f=\hat{U}_f+Y+\hat{S}_f$ obtained by adding the decoded differential vector $\hat{S}_f$ and the non-predictive mean vector Y stored in the storage 413*c* to the decoded correction vector $\hat{U}_f$ (s413) and outputs the decoded non-predictive LSP parameter vector $\hat{\Phi}_f$. Incidentally, in FIG. 9, by using the two addition units 413*a* and 413*b*, first, after the decoded differential vector $\hat{S}_f$ is added to the decoded correction vector $\hat{U}_f$ in the addition unit 413*a*, the non-predictive mean vector Y stored in the storage 413*c* is added in the addition unit 413*b*, but these additions may be performed the other way around. Alternatively, the decoded non-predictive LSP parameter vector $\hat{\Phi}_f$ may be generated by adding a vector obtained by adding the non-predictive mean vector Y and the decoded differential vector $\hat{S}_f$ to the decoded correction vector $\hat{U}_f$.

If the non-predictive addition unit 413 receives the control signal C indicating that correction decoding processing is not performed or 0 as the control signal C, in a word, if the peak-to-valley of the spectral envelope is not above the predetermined standard, that is, in the above-described example, in cases other than the case (A-1) and/or (B-1), that is, if the non-predictive addition unit 413 does not receive the decoded correction vector $\hat{U}_f$, the non-predictive addition unit 413 generates a decoded non-predictive LSP parameter vector $\hat{\Phi}_f=Y+\hat{S}_f$ (s413) and outputs the decoded non-predictive LSP parameter vector $\hat{\Phi}_f$.

Incidentally, it is assumed that the non-predictive mean vector Y used here is the same as the non-predictive mean vector Y used in the non-predictive subtraction unit 311 of the above-described linear prediction coefficient coding device 300.

Effect of the Second Embodiment

With such a configuration, in addition to preventing a transmission error in an LSP code $C_{f-1}$ of an f-1th frame from affecting the decoded non-predictive LSP parameter vector $\hat{\Phi}_f$ of an fth frame, it is possible to obtain a decoded non-predictive LSP parameter vector $\hat{\Phi}_f$ containing reduced quantization errors by adding, to the non-predictive mean vector Y and the decoded differential vector $\hat{S}_f$, the decoded correction vector $\hat{U}_f$ obtained by decoding the correction LSP code $D_f$ if the peak-to-valley height of a spectral envelope is high and reduce the code amount by an amount corresponding to the correction LSP code $D_f$ by using, as the decoded non-predictive LSP parameter vector $\hat{\Phi}_f$, what is obtained by adding the non-predictive mean vector Y and the decoded differential vector $\hat{S}_f$, which does not need the correction LSP code $D_f$, if the peak-to-valley height of a spectral envelope is not high. That is, it is possible to perform coding and decoding processing which suffers less reduction in the sound quality caused by a transmission error in a code of the preceding frame than in the existing technology while reducing the code amount as a whole compared to the coding and decoding of the first embodiment.

<Modification>

As already explained in the modification of the first embodiment, in place of the LSP parameters, other coefficients may be used as long as the coefficients are coefficients which are convertible into linear prediction coefficients. The above may be applied to PARCOR coefficients, coefficients obtained by transforming any one of the LSP parameters and the PARCOR coefficients, and linear prediction coefficients themselves. Hereinafter, a case in which PARCOR coefficients $k_f[1], k_f[2], \ldots, k_f[p]$ are used will be described.

It is known that the higher the peak-to-valley height of a spectral envelope corresponding to an LSP parameter vector $\Theta_f$ is, the smaller a value of $$\prod_{i}^{p}(1-k[i]^2)$$

determined by a PARCOR coefficient becomes. Thus, when the PARCOR coefficients are used, the index calculation unit 315 receives quantized PARCOR coefficients $\hat{k}_f[1], \hat{k}_f[2], \ldots, \hat{k}_f[p]$ and calculates an index Q' commensurate with how short the peak-to-valley height of a spectral envelope is by $$Q'=\prod_{i}^{p}(1-\hat{k}_f[i]^2)$$

(s315). In accordance with the magnitude of the index Q', the index calculation unit 315 outputs, to the correction vector coding unit 312 and the non-predictive subtraction unit 311, a control signal C indicating that correction coding processing is performed/not performed or a control signal C which is a positive integer representing a predetermined bit number or is 0. Likewise, in accordance with the magnitude of the index Q', the index calculation unit 415 outputs, to the correction vector decoding unit 411 and the non-predictive addition unit 413, a control signal C indicating that correction decoding processing is performed/not performed or a control signal C which is a positive integer representing a predetermined bit number or is 0.

The index calculation unit 315 and the index calculation unit 415 may be configured so as to output the index Q and/or the index Q' in place of the control signal C. In that case, in accordance with the magnitude of the index Q and/or the index Q', the correction vector coding unit 312 and the correction vector decoding unit 411 simply have to determine whether or not to perform coding processing and the decoding processing, respectively. Moreover, likewise, in accordance with the magnitude of the index Q and/or the index Q', the non-predictive subtraction unit 311 simply has to determine whether or not to perform subtraction processing and the non-predictive addition unit 413 simply has to determine what kind of addition processing the non-predictive addition unit 413 performs. The determinations made in the correction vector coding unit 312, the correction vector decoding unit 411, the non-predictive subtraction unit 311, and the non-predictive addition unit 413 are the same as those explained in the above-described index calculation unit 315 and index calculation unit 415.

Third Embodiment

Differences from the second embodiment will be mainly described.

A large number of candidate correction vectors stored in a correction vector codebook means that coding can be performed with an accordingly high accuracy of approximation. Thus, in the present embodiment, the correction vector coding unit and the correction vector decoding unit are executed by using a correction vector codebook whose accuracy is increased with an increase in the influence of a reduction in the accuracy of decoding caused by a transmission error in an LSP code.

Figure 11:
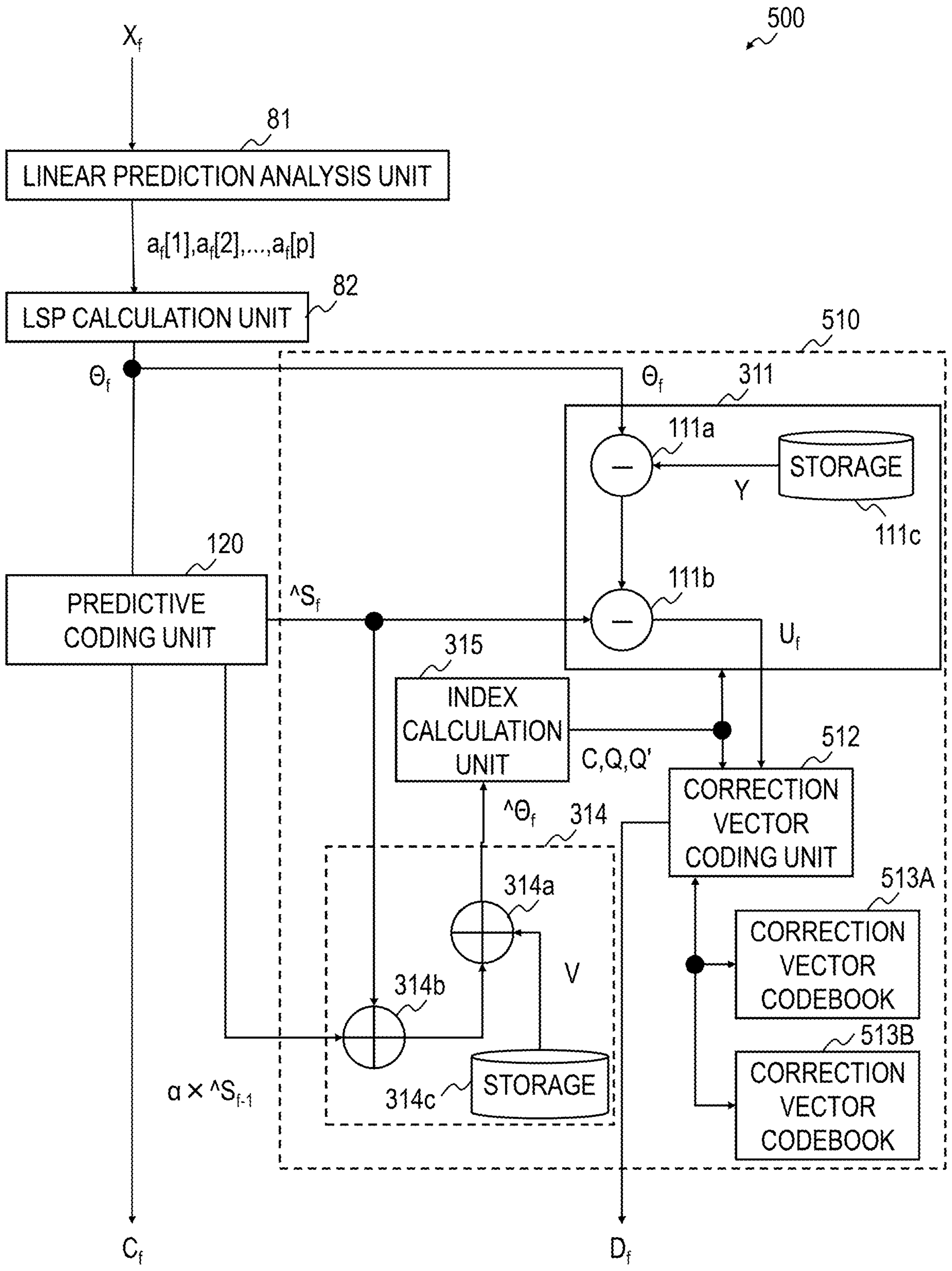
FIG. 11 is a functional block diagram of the linear prediction coefficient coding device according to the third embodiment.

Linear Prediction Coefficient Coding Device 500 According to the Third Embodiment FIG. 11 depicts a functional block diagram of a linear prediction coefficient coding device 500 of the third embodiment, and FIG. 8 depicts an example of the processing flow thereof.

The linear prediction coefficient coding device 500 of the third embodiment includes a non-predictive coding unit 510 in place of the non-predictive coding unit 310.

The non-predictive coding unit 510 includes the non-predictive subtraction unit 311, a correction vector coding unit 512, correction vector codebooks 513A and 513B, the predictive addition unit 314, and the index calculation unit 315. As is the case with the linear prediction coefficient coding devices 100 and 300 of the first and second embodiments, if LSP parameters θ derived from a sound signal $X_f$ are generated by another device and the input of the linear prediction coefficient coding device 500 is the LSP parameters $\theta_f[1], \theta_f[2], \ldots, \theta_f[p]$, the linear prediction coefficient coding device 500 does not have to include the linear prediction analysis unit 81 and the LSP calculation unit 82.

The differences from the second embodiment lie in that the linear prediction coefficient coding device 500 of the third embodiment includes a plurality of correction vector codebooks and the correction vector coding unit 512 performs coding by selecting any one of the correction vector codebooks in accordance with the index Q and/or Q' calculated in the index calculation unit 315.

Hereinafter, a description will be given by taking up as an example a case in which the two types of correction vector codebooks 513A and 513B are provided.

The correction vector codebooks 513A and 513B differ from each other in the total number of candidate correction vectors stored therein. A large total number of candidate correction vectors means a large bit number of a corresponding correction vector code. To put it the other way around, the larger the bit number of a correction vector code is made, the more candidate correction vectors can be prepared. For example, if the bit number of a correction vector code is assumed to be A, up to $2^A$ candidate correction vectors can be prepared.

Hereinafter, a description will be given on the assumption that the total number of candidate correction vectors stored in the correction vector codebook 513A is larger than the total number of candidate correction vectors stored in the correction vector codebook 513B. In other words, the code length (average code length) of the codes stored in the correction vector codebook 513A is larger than the code length (average code length) of the codes stored in the correction vector codebook 513B. For example, $2^A$ pairs of a correction vector code having a code length of A-bit and a candidate correction vector are stored in the correction vector codebook 513A, and $2^B$ ($2^B<2^A$) pairs of a correction vector code having a code length of B-bit (B<A) and a candidate correction vector are stored in the correction vector codebook 513B.

Incidentally, in the present embodiment, as already explained in the modification part of the second embodiment, the index calculation unit outputs the index Q and/or the index Q' in place of the control signal C, and, in accordance with the magnitude of the index Q and/or the index Q', the correction vector coding unit and the correction vector decoding unit determine what kind of coding and decoding the correction vector coding unit and the correction vector decoding unit perform, respectively. However, as in the second embodiment, a configuration may be adopted in which the index calculation unit determines what kind of coding and decoding is performed and outputs the control signal C. Incidentally, as already explained in the modification part of the second embodiment, in accordance with the magnitude of the index Q and/or the index Q', the non-predictive subtraction unit 311 determines whether or not to perform subtraction processing and the non-predictive addition unit 413 determines what kind of addition processing the non-predictive addition unit 413 performs.

<Correction Vector Coding Unit 512>

The correction vector coding unit 512 receives the index Q and/or the index Q' and the correction vector $U_f$. The correction vector coding unit 512 obtains a correction LSP code $D_f$ whose bit number becomes greater (code length becomes larger) as (A-2) the index Q increases and/or (B-2) the index Q' decreases (s512) and outputs the correction LSP code $D_f$. For example, the correction vector coding unit 512 performs coding in the following manner by using a predetermined threshold value Th2 and/or a predetermined threshold value Th2'. Incidentally, since the correction vector coding unit 512 performs coding processing if the index Q is larger than or equal to the predetermined threshold value Th1 and/or the index Q' is smaller than or equal to the predetermined threshold value Th1', Th2 is a value greater than Th1 and Th2' is a value smaller than Th1'.

If (A-5) the index Q is larger than or equal to the predetermined threshold value Th2 and/or (B-5) the index Q' is smaller than or equal to the predetermined threshold value Th2', A which is a positive integer is assumed to be set as the bit number of the correction LSP code $D_f$, and the correction vector coding unit 512 obtains a correction LSP code $D_f$ by coding the correction vector $U_f$ by referring to the correction vector codebook 513A storing the $2^A$ pairs of a correction vector code having the bit number (code length) A and a candidate correction vector (s512) and outputs the correction LSP code $D_f$.

If (A-6) the index Q is smaller than the predetermined threshold value Th2 and the index Q is larger than or equal to the predetermined threshold value Th1 and/or (B-6) the index Q' is larger than the predetermined threshold value Th2' and the index Q' is smaller than or equal to the predetermined threshold value Th1', B which is a positive integer less than the bit number A is assumed to be set as the bit number of the correction LSP code $D_f$, and the correction vector coding unit 512 obtains a correction LSP code $D_f$ by coding the correction vector $U_f$ by referring to the correction vector codebook 513B storing the $2^B$ pairs of a correction vector code having the bit number (code length) B and a candidate correction vector (s512) and outputs the correction LSP code $D_f$.

In other cases (C-6), 0 is assumed to be set as the bit number of the correction LSP code $D_f$, and the correction vector coding unit 512 does not code the correction vector $U_f$ and does not obtain and output a correction LSP code $D_f$.

Thus, the correction vector coding unit 512 of the third embodiment is executed when the index Q calculated in the index calculation unit 315 is larger than the predetermined threshold value Th1 and/or the index Q' calculated in the index calculation unit 315 is smaller than the predetermined threshold value Th1'.

Figure 12:
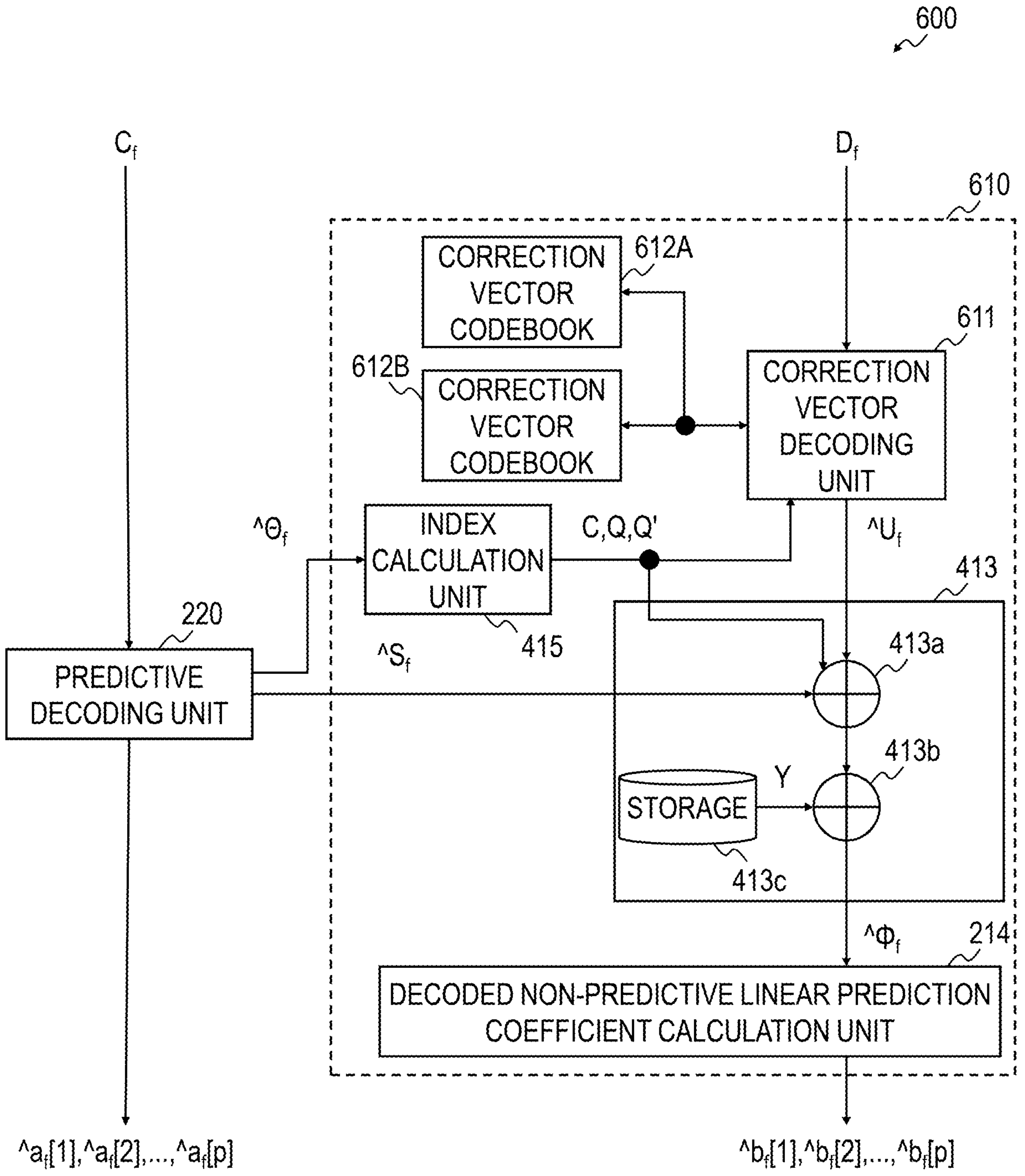
FIG. 12 is a functional block diagram of the linear prediction coefficient decoding device according to the third embodiment.

Linear Prediction Coefficient Decoding Device 600 According to the Third Embodiment FIG. 12 depicts a functional block diagram of a linear prediction coefficient decoding device 600 according to the third embodiment, and FIG. 10 depicts an example of the processing flow thereof.

The linear prediction coefficient decoding device 600 of the third embodiment includes a non-predictive decoding unit 610 in place of the non-predictive decoding unit 410.

The non-predictive decoding unit 610 includes the non-predictive addition unit 413, a correction vector decoding unit 611, correction vector codebooks 612A and 612B, and the index calculation unit 415 and, when necessary, also includes the decoded non-predictive linear prediction coefficient calculation unit 214.

Differences from the linear prediction coefficient decoding device 400 of the second embodiment lie in that the linear prediction coefficient decoding device 600 of the third embodiment includes a plurality of correction vector codebooks and the correction vector decoding unit 611 performs decoding by selecting any one of the correction vector codebooks in accordance with the index Q and/or Q' calculated in the index calculation unit 415.

Hereinafter, a description will be given by taking up as an example a case in which the two types of correction vector codebooks 612A and 612B are provided.

The correction vector codebooks 612A and 612B store the contents shared by the correction vector codebooks 513A and 5131B, respectively, of the linear prediction coefficient coding device 500. That is, in the correction vector codebooks 612A and 612B, candidate correction vectors and correction vector codes corresponding to the candidate correction vectors are stored, and the code length (average code length) of the codes stored in the correction vector codebook 612A is larger than the code length (average code length) of the codes stored in the correction vector codebook 612B. For example, $2^A$ pairs of a correction vector code having a code length of A-bit and a candidate correction vector are stored in the correction vector codebook 612A, and $2^B$ ($2^B<2^A$) pairs of a correction vector code having a code length of B-bit (B<A) and a candidate correction vector are stored in the correction vector codebook 612B.

<Correction Vector Decoding Unit 611>

The correction vector decoding unit 611 receives the index Q and/or the index Q' and the correction LSP code $D_f$. The correction vector decoding unit 611 obtains a decoded correction vector $\hat{U}_f$ from a large number of candidate correction vectors by decoding a correction LSP code $D_f$ with a bit number depending on the magnitude of the index Q and the index Q', such that (A-2) the larger the index Q and/or (B-2) the smaller the index Q', the greater the bit number (s611). For example, the correction vector decoding unit 611 performs decoding in the following manner by using a predetermined threshold value Th2 and/or Th2'. Incidentally, since the correction vector decoding unit 611 performs the decoding processing if the index Q is larger than or equal to the predetermined threshold value Th1 and/or the index Q' is smaller than or equal to the predetermined threshold value Th1', Th2 is a value greater than Th1 and Th2' is a value smaller than Th1'.

If (A-5) the index Q is larger than or equal to the predetermined threshold value Th2 and/or (B-5) the index Q' is smaller than or equal to the predetermined threshold value Th2', A which is a positive integer is assumed to be set as the bit number of the correction LSP code $D_f$, and the correction vector decoding unit 611 obtains, as a decoded correction vector $\hat{U}_f$, a candidate correction vector corresponding to a correction vector code that coincides with the correction LSP code $D_f$ by referring to the correction vector codebook 612A storing the $2^A$ pairs of a correction vector code having the bit number (code length) A and a candidate correction vector (s611) and outputs the decoded correction vector $\hat{U}_f$.

If (A-6) the index Q is smaller than the predetermined threshold value Th2 and the index Q is larger than or equal to the predetermined threshold value Th1 and/or (B-6) the index Q' is larger than the predetermined threshold value Th2' and the index Q' is smaller than or equal to the predetermined threshold value Th1', B which is a positive integer less than the bit number A is assumed to be set as the bit number of the correction LSP code $D_f$, and the correction vector decoding unit 611 obtains, as a decoded correction vector $\hat{U}_f$, a candidate correction vector corresponding to a correction vector code that coincides with the correction LSP code $D_f$ by referring to the correction vector codebook 612B storing the $2^B$ pairs of a correction vector code having the bit number (code length) B and a candidate correction vector (s611) and outputs the decoded correction vector $\hat{U}_f$.

In other cases (C-6), 0 is assumed to be set as the bit number of the correction LSP code $D_f$, and the correction vector decoding unit 611 does not decode the correction LSP code $D_f$ and does not generate a decoded correction vector $\hat{U}_f$.

Thus, the correction vector decoding unit 611 of the third embodiment is executed if the index Q calculated in the index calculation unit 415 is larger than the predetermined threshold value Th1 and/or the index Q' calculated in the index calculation unit 415 is smaller than the predetermined threshold value Th1'.

Effect of the Third Embodiment

With such a configuration, it is possible to obtain the effect similar to that of the second embodiment. In addition, by changing the accuracy of approximation depending on the magnitude of the influence of a reduction in the accuracy of decoding caused by a transmission error in an LSP code, it is possible to perform coding and decoding processing of higher sound quality than the coding and decoding of the second embodiment while reducing the code amount as a whole compared to the coding and decoding of the first embodiment.

<Modification>

The number of correction vector codebooks does not necessarily have to be two and may be three or more. The bit number (bit length) of stored correction vector codes differs from correction vector codebook to correction vector codebook, and correction vectors corresponding to the correction vector codes are stored. It is necessary simply to set a threshold value depending on the number of correction vector codebooks. A threshold value for the index Q simply has to be set in such a way that the greater the value of the threshold value becomes, the greater the bit number of a correction vector code becomes, the correction vector code which is stored in the correction vector codebook that is used if the index Q is larger than or equal to that threshold value. Likewise, a threshold value for the index Q' simply has to be set in such a way that the smaller the value of the threshold value becomes, the greater the bit number of a correction vector code becomes, the correction vector code which is stored in the correction vector codebook that is used if the index Q' is smaller than or equal to that threshold value. With such a configuration, it is possible to perform coding and decoding of higher accuracy while reducing the code amount as a whole.

Coding Device 700 According to a Fourth Embodiment

A coding device 700 according to a fourth embodiment is what is obtained by applying the linear prediction coefficient coding device 100 and the linear prediction coefficient decoding device 200 of the first embodiment to TCX (transform coded excitation) coding method which is a coding method in a frequency domain.

Figure 13:
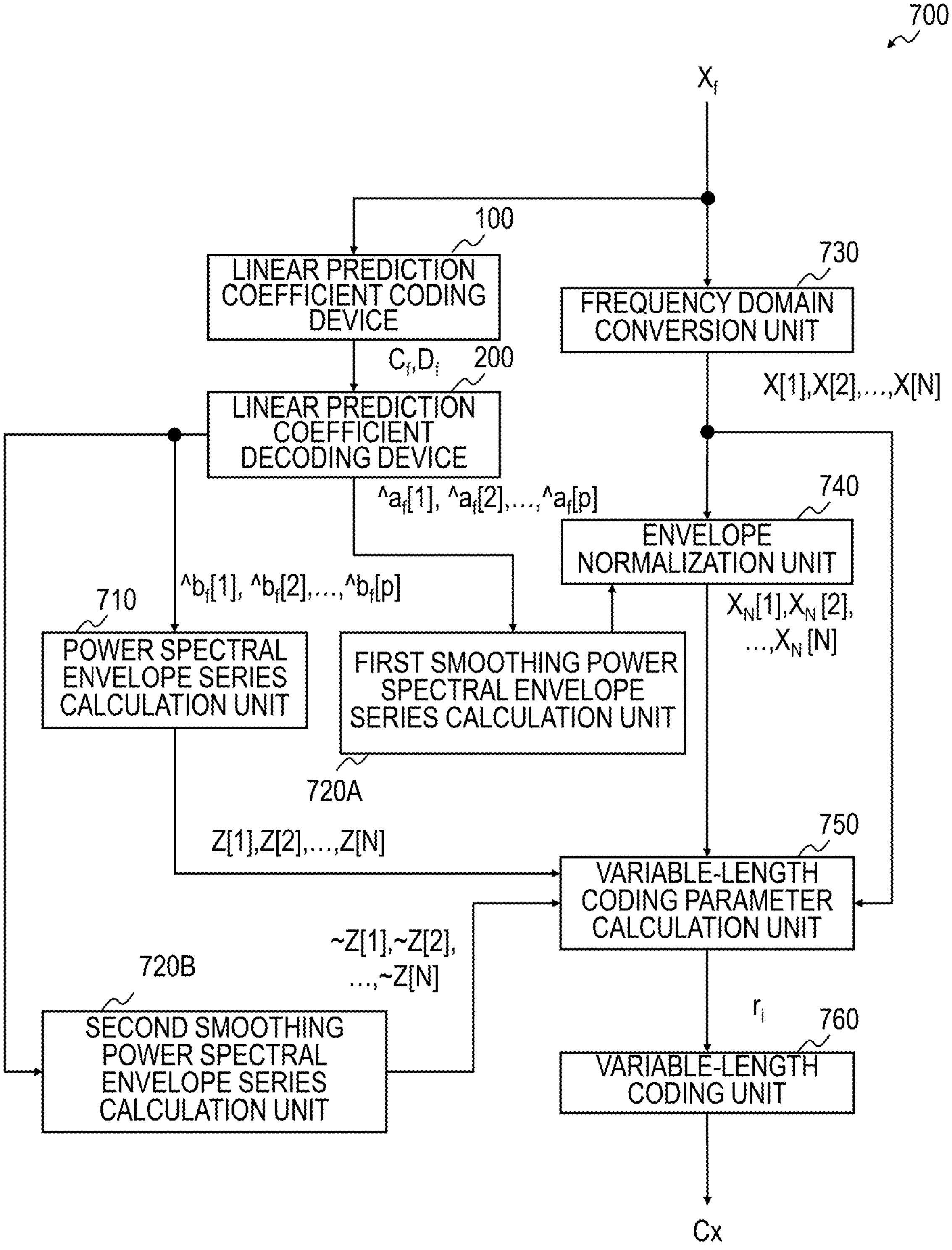
FIG. 13 is a functional block diagram of a coding device according to a fourth embodiment.
Figure 14:
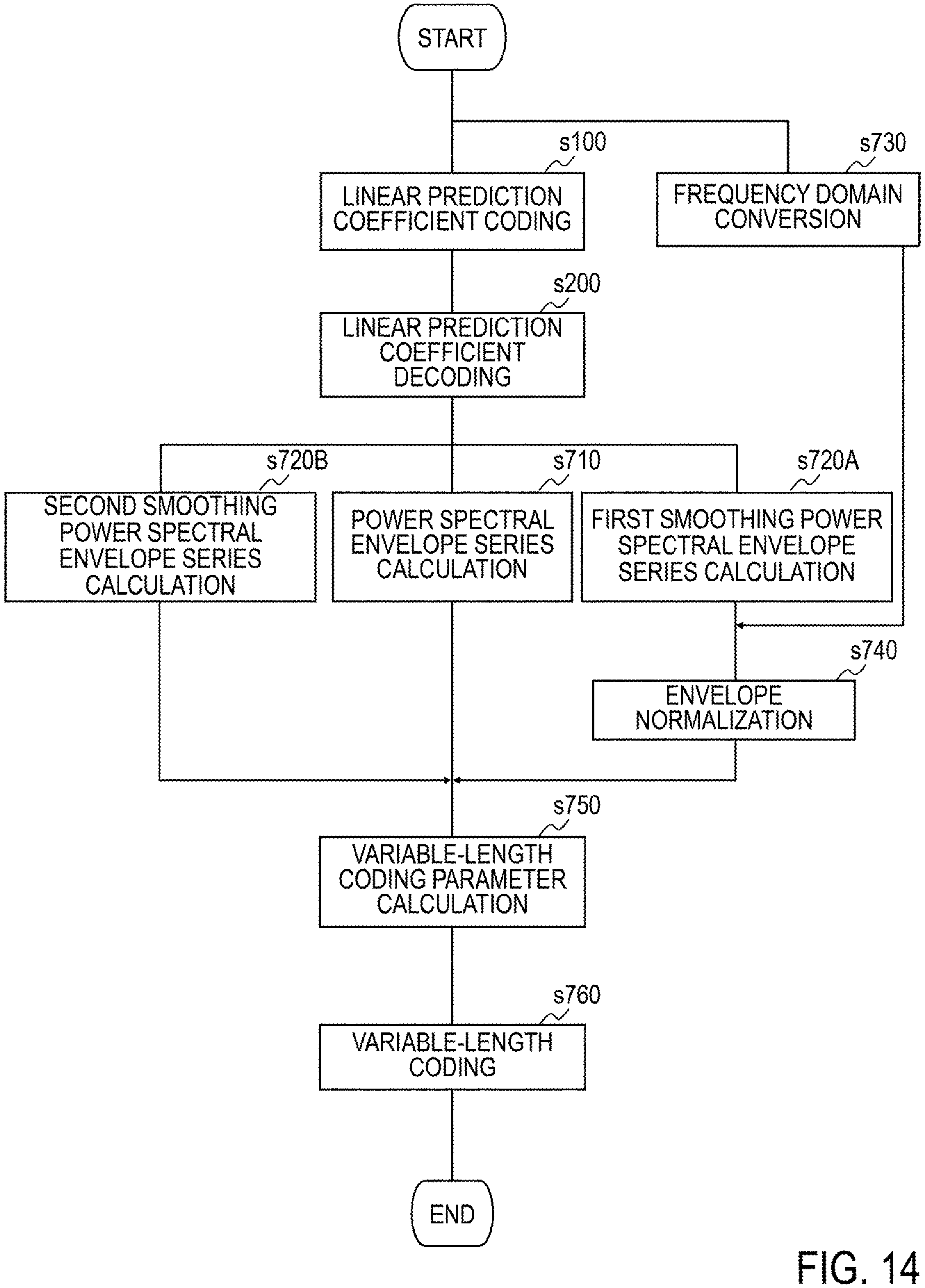
FIG. 14 is a diagram depicting an example of the processing flow of the coding device according to the fourth embodiment.

FIG. 13 depicts a functional block diagram of the coding device 700 of the fourth embodiment, and FIG. 14 depicts an example of the processing flow thereof.

The coding device 700 of the fourth embodiment includes the linear prediction coefficient coding device 100, the linear prediction coefficient decoding device 200, a power spectral envelope series calculation unit 710, a first smoothing power spectral envelope series calculation unit 720A, a second smoothing power spectral envelope series calculation unit 720B, a frequency domain conversion unit 730, an envelope normalization unit 740, a variable-length coding parameter calculation unit 750, and a variable-length coding unit 760. Incidentally, in place of the linear prediction coefficient coding device 100 and the linear prediction coefficient decoding device 200, the linear prediction coefficient coding devices 300 and 500 and the linear prediction coefficient decoding devices 400 and 600 of the second and third embodiments may be used.

The coding device 700 of the fourth embodiment receives an input sound signal $X_f$ and outputs a frequency domain signal code.

<Linear Prediction Coefficient Coding Device 100>

The linear prediction coefficient coding device 100 receives the sound signal $X_f$, obtains an LSP code $C_f$ and a correction LSP code $D_f$ (s100), and outputs the LSP code $C_f$ and the correction LSP code $D_f$.

<Linear Prediction Coefficient Decoding Device 200>

The linear prediction coefficient decoding device 200 receives the LSP code $C_f$ and the correction LSP code $D_f$, obtains predictive quantization linear prediction coefficients $\hat{a}_f[1], \hat{a}_f[2], \ldots, \hat{a}_f[p]$ and non-predictive quantization linear prediction coefficients $\hat{b}_f[1], \hat{b}_f[2], \ldots, \hat{b}_f[p]$ (s200), and outputs the predictive quantization linear prediction coefficients $\hat{a}_f[1], \hat{a}_f[2], \ldots, \hat{a}_f[p]$ and the non-predictive quantization linear prediction coefficients $\hat{b}_f[1], \hat{b}_f[2], \ldots, \hat{b}_f[p]$.

Incidentally, the linear prediction coefficient coding device 100 of the coding device 700 may be configured so as to obtain, when obtaining the LSP code $C_f$ and the correction LSP code $D_f$, predictive quantization linear prediction coefficients $\hat{a}_f[1], \hat{a}_f[2], \ldots, \hat{a}_f[p]$ corresponding to the LSP code $C_f$ and non-predictive quantization linear prediction coefficients $\hat{b}_f[1], \hat{b}_f[2], \ldots, \hat{b}_f[p]$ corresponding to the LSP code $C_f$ and the correction LSP code $D_f$. In this case, the coding device 700 does not have to include the linear prediction coefficient decoding device 200.

<Power Spectral Envelope Series Calculation Unit 710>

The power spectral envelope series calculation unit 710 receives the non-predictive quantization linear prediction coefficients $\hat{b}_f[1], \hat{b}_f[2], \ldots, \hat{b}_f[p]$. The power spectral envelope series calculation unit 710 calculates a power spectral envelope series Z[1], . . . , Z[N] of the input sound signal at point N by using the non-predictive quantization linear prediction coefficients $\hat{b}_f[1], \hat{b}_f[2], \ldots, \hat{b}_f[p]$ (s710) and outputs the power spectral envelope series Z[1], . . . , Z[N]. For example, each value Z[n] of the power spectral envelope series can be determined by the following formula.

$$Z[n] = \frac{\sigma^2}{2\pi\left|1 + \prod_{i=1}^{p}\hat{b}_f[i]\cdot\exp(-ijn)\right|^2}$$

where n is an integer 1≤n≤N, exp(·) is an exponential function using Napier's constant as a base, j is an imaginary unit, and $\sigma^2$ is prediction residual energy.

First Smoothing Power Spectral Envelope Series Calculation Unit 720A>

The first smoothing power spectral envelope series calculation unit 720A receives the predictive quantization linear prediction coefficients $\hat{a}_f[1], \hat{a}_f[2], \ldots, \hat{a}_f[p]$. By using the predictive quantization linear prediction coefficients $\hat{a}_f[1], \hat{a}_f[2], \ldots, \hat{a}_f[p]$ and a correction factor $\gamma^i$ which is given in advance and is a positive constant smaller than or equal to 1, the first smoothing power spectral envelope series calculation unit 720A calculates a first smoothed power spectral envelope series $\tilde{W}[1], \tilde{W}[2], \ldots, \tilde{W}[N]$ by $$\tilde{W}[n] = \frac{\sigma^2}{2\pi\left|1 + \sum_{i=1}^{p} \hat{a}_f[i] \cdot \gamma^i \cdot \exp(-ijn)\right|^2}$$

(s720A), and outputs the first smoothed power spectral envelope series ~W[1], ~W[2], . . . , ~W[N].

The first smoothed power spectral envelope series ~W[1], ~W[2], . . . , ~W[N] corresponds to a series obtained by flattening (smoothing) the waves of the amplitude of a power spectral envelope series W[1], W[2], . . . , W[N] determined by the predictive quantization linear prediction coefficients $\hat{a}_f[1]$, $\hat{a}_f[2]$, . . . , $\hat{a}_f[p]$. $\gamma^i$ is a positive constant that determines the degree of smoothing.

<Second Smoothing Power Spectral Envelope Series Calculation Unit 720B>

The second smoothing power spectral envelope series calculation unit 720B receives the non-predictive quantization linear prediction coefficients $\hat{b}_f[1]$, $\hat{b}_f[2]$, . . . , $\hat{b}_f[p]$. By using the non-predictive quantization linear prediction coefficients $\hat{b}_f[1]$, $\hat{b}_f[2]$, . . . , $\hat{b}_f[p]$ and a correction factor $\gamma^i$ which is given in advance and is a positive constant smaller than or equal to 1, the second smoothing power spectral envelope series calculation unit 720B calculates a second smoothed power spectral envelope series ~Z[1], ~Z[2], . . . , ~Z[N] by $$\tilde{Z}[n] = \frac{\sigma^2}{2\pi\left|1 + \sum_{i=1}^{p} \hat{b}_f[i] \cdot \gamma^i \cdot \exp(-ijn)\right|^2}$$

(s720B) and outputs the second smoothed power spectral envelope series ~Z[1], ~Z[2], . . . , ~Z[N].

The second smoothed power spectral envelope series ~Z[1], ~Z[2], . . . , ~Z[N] corresponds to a series obtained by flattening (smoothing) the waves of the amplitude of a power spectral envelope series Z[1], Z[2], . . . , Z[N] determined by the non-predictive quantization linear prediction coefficients $\hat{b}_f[1]$, $\hat{b}_f[2]$, . . . , $\hat{b}_f[p]$. Y is a positive constant that determines the degree of smoothing.

<Frequency Domain Conversion Unit 730>

The frequency domain conversion unit 730 converts the input sound signal $X_f$, which is input to the frequency domain conversion unit 730, in the time domain into MDCT coefficient sequence X[1], . . . , X[N] at point N in the frequency domain frame by frame which is a predetermined time segment (s730) and outputs the MDCT coefficient sequence X[1], . . . , X[N]. Here, N is a positive integer.

<Envelope Normalization Unit 740>

The envelope normalization unit 740 receives the MDCT coefficient sequence X[1], . . . , X[N] and the first smoothed power spectral envelope series ~W[1], ~W[2], . . . , ~W[N], obtains a normalized MDCT coefficient sequence $X_N[1]$, . . . , $X_N[N]$ which is a series obtained by normalizing each coefficient X[i] of the MDCT coefficient sequence X[1], . . . , X[N] by the square root of each value ~W[i] of the first smoothed power spectral envelope series ~W[1], ~W[2], . . . , ~W[N] (s740), and outputs the normalized MDCT coefficient sequence $X_N[1]$, . . . , $X_N[N]$. That is, $X_N[i]$=X[i]/sqrt(~W[i]) holds. Here, sqrt(·) is a symbol representing the one-half power.

<Variable-Length Coding Parameter Calculation Unit 750>

The variable-length coding parameter calculation unit 750 receives the power spectral envelope series Z[1], . . . , Z[N], the second smoothed power spectral envelope series ~Z[1], . . . , ~Z[N], the MDCT coefficient sequence X[1], . . . , X[N], and the normalized MDCT coefficient sequence $X_N[1]$, . . . , $X_N[N]$. By using these values, the variable-length coding parameter calculation unit 750 calculates a variable-length coding parameter $r_i$ which is a parameter for performing variable-length coding of the normalized MDCT coefficient sequence $X_N[1]$, . . . , $X_N[N]$ (s750) and outputs the variable-length coding parameter $r_i$. The variable-length coding parameter $r_i$ is a parameter that specifies a possible range of the amplitude of the normalized MDCT coefficient sequence $X_N[1]$, . . . , $X_N[N]$to be coded. In the case of Rice coding, a Rice parameter corresponds to the variable-length coding parameter; in the case of arithmetic coding, a possible range of the amplitude of an object to be coded corresponds to the variable-length coding parameter.

When variable-length coding is performed per sample, a variable-length coding parameter is calculated for each coefficient $X_N[i]$ of the normalized MDCT coefficient sequence. When variable-length coding is performed collectively for a sample group formed of a plurality of samples (for example, two samples at a time), a variable-length coding parameter is calculated for each sample group. That is, the variable-length coding parameter calculation unit 750 calculates a variable-length coding parameter for a normalized partial coefficient sequence which is part of the normalized MDCT coefficient sequence. Here, it is assumed that there are a plurality of normalized partial coefficient sequences and, in the plurality of normalized partial coefficient sequences, coefficients of the normalized MDCT coefficient sequence are included without overlaps.

Hereinafter, a method of calculating a variable-length coding parameter will be described by taking up as an example a case in which Rice coding is performed per sample.

(Step 1) For example, by the following formula, the logarithm of the average of the amplitudes of the coefficients of the normalized MDCT coefficient sequence $X_N[1]$, $X_N[2]$, . . . , $X_N[N]$ is calculated as a Rice parameter sb.

$$sb = \log_2\left\{(\ln 2) \cdot \frac{2\sum_{i=1}^{N} |X_N[i]|}{N}\right\}$$

sb is coded only once in each frame and is transmitted to the decoding device as a code corresponding to a reference Rice parameter.

Alternatively, when the amplitude of X[i] can be estimated by another information which is transmitted to the decoding device, a method of approximately determining sb from the estimated value of the amplitude of X[i], the method shared by the coding device 700 and the decoding device, may be set. In this case, there is no need to code sb and output a code corresponding to a reference Rice parameter to the decoding device.

(Step 2) A threshold value θ is calculated by the following formula.

$$\theta = \log_2\left\{(\ln 2) \cdot \frac{2\sum_{i=1}^{N} \left|\sqrt{Z[i]} / \sqrt{\tilde{Z}[i]}\right|}{N}\right\}$$

(Step 3) The greater the extent to which |sqrt(Z[i])/sqrt(~Z[i])| is greater than θ, the greater a value than sb, the value to which the Rice parameter $r_i$ is set. The lesser the extent to which |sqrt(Z[i])/sqrt(~Z[i])| is smaller than θ, the smaller a value than sb, the value to which the Rice parameter $r_i$ is set.

(Step 4) By repeatedly performing the processing in step 3 on all of i=1, 2, . . . , N, a Rice parameter $r_i$ for each normalized MDCT coefficient $X_N[i]$ is obtained.

<Variable-Length Coding Unit 760>

The variable-length coding unit 760 receives the variable-length coding parameter $r_i$, performs variable-length coding on the normalized coefficient sequence $X_N(1)$, . . . , $X_N(N)$ by using this value, and outputs a variable-length code $C_X$ (s760).

Effect of the Fourth Embodiment

The fourth embodiment has a configuration in which the normalized MDCT coefficient sequence $X_N[1]$, . . . , $X_N[N]$ obtained by normalizing the MDCT coefficient sequence X[1], X[2], . . . , X[N] by the smoothed power spectral envelope series is coded by using a variable-length coding parameter.

Since it is necessary to obtain, by using the most accurate possible power spectral envelope series, a normalized MDCT coefficient sequence on which variable-length coding is to be performed, the envelope normalization unit 740 generates a normalized MDCT coefficient sequence by using the first smoothed power spectral envelope series ~W[1], ~W[2], . . . , ~W[N] determined by the predictive quantization linear prediction coefficients $\hat{a}_f[1]$, $\hat{a}_f[2]$, . . . , $\hat{a}_f[p]$, the first smoothed power spectral envelope series ~W[1], ~W[2], . . . , ~W[N] whose difference from a power spectral envelope series determined by smoothing linear prediction coefficients is small.

The variable-length coding parameter calculation unit 750 uses a power spectral envelope series and a smoothed power spectral envelope series to obtain a variable-length coding parameter. Thus, it is also desirable that, for the power spectral envelope series and the smoothed power spectral envelope series which are used in the variable-length coding parameter calculation unit 750, a difference from a power spectral envelope series which is determined by linear prediction coefficients and a power spectral envelope series which is determined by smoothing linear prediction coefficients is small. However, not only when a transmission error occurs in an LSP code of the present frame, but also when a transmission error occurs in an LSP code of the preceding frame, the correct values of the predictive quantization linear prediction coefficients $\hat{a}_f[1]$, $\hat{a}_f[2]$, . . . , $\hat{a}_f[p]$ cannot be obtained on the decoding side. That is, if a variable-length coding parameter is determined from a power spectral envelope series and a smoothed power spectral envelope series which are determined from the predictive quantization linear prediction coefficients $\hat{a}_f[1]$, $\hat{a}_f[2]$, . . . , $\hat{a}_f[p]$, it becomes impossible to perform variable-length decoding correctly not only when a transmission error occurs in an LSP code of the present frame, but also when a transmission error occurs in an LSP code of the preceding frame.

Thus, in the fourth embodiment, a variable-length coding parameter is determined by using a power spectral envelope series and a smoothed power spectral envelope series which are determined from the non-predictive quantization linear prediction coefficients $\hat{b}_f[1]$, $\hat{b}_f[2]$, . . . , $\hat{b}_f[p]$. As a result, even when a transmission error occurs in an LSP code of the preceding frame, since it is possible to obtain the same non-predictive quantization linear prediction coefficients $\hat{b}_f[1]$, $\hat{b}_f[2]$, . . . , $\hat{b}_f[p]$, power spectral envelope series Z[1], Z[2], . . . , Z[N], and second smoothed power spectral envelope series ~Z[1], ~Z[2], . . . , ~Z[N] as those on the coding side in the present frame if no transmission error occurs in an LSP code of the present frame, it is possible to obtain the same variable-length coding parameter as that on the coding side in the present frame and thereby increase the resistance to a transmission error in an LSP code.

Incidentally, in the fourth embodiment, a normalized MDCT coefficient sequence $X_N[1]$, . . . , $X_N[N]$ obtained by using the first smoothed power spectral envelope series ~W[1], ~W[2], . . . , ~W[N] is set as an object on which variable-length coding is to be performed. Therefore, not only when a transmission error occurs in an LSP code of the present frame, but also when a transmission error occurs in an LSP code of the preceding frame, an error occurs in the square root of each value of a smoothed power spectral envelope series by which the normalized MDCT coefficient sequence $X_N[1]$, . . . , $X_N[N]$ is multiplied on the decoding side and distortion undesirably occurs in an MDCT coefficient sequence which is obtained by decoding. However, this is less problematic than an error in a variable-length coding parameter that makes variable-length decoding itself incorrect.

<First Modification>

In the above first to fourth embodiments, only an LSP parameter (a low-order LSP parameter) whose order is lower than or equal to a predetermined order $T_L$ lower than a prediction order p may be set as an object on which processing (non-predictive coding processing) is to be performed, the processing being performed in the non-predictive coding unit 110 of the linear prediction coefficient coding device 100 of FIG. 3, the non-predictive coding unit 310 of the linear prediction coefficient coding device 300 of FIG. 7, and the non-predictive coding unit 510 of the linear prediction coefficient coding device 500 of FIG. 11, and processing corresponding to those described above may be performed also on the decoding side.

First, each of the non-predictive coding units 110, 310, and 510 will be described.

<Non-Predictive Subtraction Units 111 and 311>

The non-predictive subtraction units 111 and 311 generate a low-order correction vector $U'_f=\Theta'_f-Y'-\hat{S}'_f$ that is a vector obtained by subtracting, from a low-order LSP parameter vector $\Theta'_f=(\theta_f[1], \theta_f[2], \ldots, \theta_f[T_L])^T$ formed of LSP parameters, whose orders are lower than or equal to the order $T_L$, of the input LSP parameter vector $\Theta_f=(\theta_f[1], \theta_f[2], \ldots, \theta_f[p])^T$, a non-predictive low-order mean vector $Y'=(y[1], y[2], \ldots, y[T_L])^T$ stored in the storage 111c and a low-order quantization differential vector $\hat{S}'_f=(\hat{s}_f[1], \hat{s}_f[2], \ldots, \hat{s}_f[T_L])^T$ formed of elements, whose orders are lower than or equal to the order TL, of the input quantization differential vector $\hat{S}_f=(\hat{s}_f[1], \hat{s}_f[2], \ldots, \hat{s}_f[p])^T$, and output the low-order correction vector $U'_f$. That is, the non-predictive subtraction units 111 and 311 generate a low-order correction vector $U'_f$ that is a vector formed of some of the elements of the correction vector $U_f$ and output the low-order correction vector $U'_f$.

Here, the non-predictive low-order mean vector $Y'=(y[1], y[2], \ldots, y[T_L])^T$ is a predetermined vector and is a vector formed of elements, whose orders are lower than or equal to the order $T_L$, of the non-predictive mean vector $Y=(y[1], y[2], \ldots, y[p])^T$ which is used in the decoding device of the first modification.

Incidentally, a low-order LSP parameter vector $\Theta'_f$ formed of LSP parameters, whose orders are lower than or equal to the order $T_L$, of the LSP parameter vector $\Theta_f$ may be output from the LSP calculation unit 82 and input to the non-predictive subtraction units 111 and 311. Moreover, a low-order quantization differential vector $\hat{S}'_f$ formed of elements, whose orders are lower than or equal to the order $T_L$, of the quantization differential vector $\hat{S}_f$ may be output from the vector coding unit 84 and input to the non-predictive subtraction units 111 and 311.

<Correction Vector Coding Units 112, 312, and 512>

The correction vector coding units 112, 312, and 512 code the low-order correction vector $U'_f$ that is a vector formed of some of the elements of the correction vector $U_f$ by referring to the correction vector codebooks 113, 513A, and 513B. The candidate correction vectors that are stored in the correction vector codebooks 113, 513A, and 513B simply have to be vectors of the order $T_L$.

Next, the linear prediction coefficient decoding devices 200, 400, and 600 of the first modification will be described.

Processing (non-predictive decoding processing) which is performed in the non-predictive decoding unit 210 of the linear prediction coefficient decoding device 200 of the first modification, the non-predictive decoding unit 410 of the linear prediction coefficient decoding device 400 of the first modification, and the non-predictive decoding unit 610 of the linear prediction coefficient decoding device 600 of the first modification will be described.

<Correction Vector Decoding Units 211, 411, and 611>

The correction vector decoding units 211, 411, and 611 receive a correction LSP code $D_f$, obtain a decoded low-order correction vector $\hat{U}'_f$ by decoding the correction LSP code $D_f$ by referring to the correction vector codebooks 212, 612A, and 612B, and output the decoded low-order correction vector $\hat{U}'_f$. The decoded low-order correction vector $\hat{U}'_f=(u_f[1], u_f[2], \ldots, u_f[T_L])^T$ is a vector of the order $T_L$. The candidate correction vectors that are stored in the correction vector codebooks 212, 612A, and 612B simply have to be vectors of the order $T_L$ as in the case of the correction vector codebooks 113, 513A, and 513B.

<Non-Predictive Addition Unit 213>

The non-predictive addition unit 213 receives the decoded low-order correction vector $\hat{U}'_f=(u_f[1], u_f[2], \ldots, u_f[T_L])^T$, the non-predictive mean vector $Y=(y[1], y[2], \ldots, y[p])^T$, and the decoded differential vector $\hat{S}_f=(\hat{s}_f[1], \hat{s}_f[2], \ldots, \hat{S}_f[p])^T$.

The non-predictive addition unit 213 generates a decoded non-predictive LSP parameter vector $\hat{\Theta}_f$ which is obtained by adding the elements of the decoded low-order correction vector $\hat{U}'_f$, the decoded differential vector $\hat{S}_f$, and the non-predictive mean vector Y for each order which is lower than or equal to the order $T_L$ and by adding the elements of the decoded differential vector $\hat{S}_f$ and the non-predictive mean vector Y for each order which is lower than or equal to the order p and is higher than the order $T_L$, and outputs the decoded non-predictive LSP parameter vector $\hat{\Phi}_f$. That is, the decoded non-predictive LSP parameter vector $\hat{\Phi}_f$ is $\hat{\Phi}_f=(u_f[1]+y[1]+\hat{s}_f[1], u_f[2]+y[2]+\hat{s}_f[2], \ldots, u_f[T_L]+y[T_L]+\hat{s}_f[T_L], y[T_L+i]+\hat{s}_f[T_L+i], \ldots, y[p]+\hat{s}_f[p])$.

<Non-Predictive Addition Unit 413>

The non-predictive addition unit 413 receives the decoded low-order correction vector $\hat{U}'_f=(u_f[1], u_f[2], \ldots, u_f[T_L])^T$, the non-predictive mean vector $Y=(y[1], y[2], \ldots, y[p])^T$, and the decoded differential vector $\hat{S}_f=(\hat{S}_f[I], \hat{s}_f[2], \ldots, \hat{S}_f[p])^T$.

If the non-predictive addition unit 413 receives the control signal C indicating that correction decoding processing is performed or a positive integer (or a code representing a positive integer) as the control signal C, in a word, if the peak-to-valley of the spectral envelope is above the predetermined standard, in the case of (A-1) and/or (B-1), the non-predictive addition unit 413 generates a decoded non-predictive LSP parameter vector $\hat{\Phi}_f$ which is obtained by adding the elements of the decoded low-order correction vector $\hat{U}'_f$, the decoded differential vector $\hat{S}_f$, and the non-predictive mean vector Y for each order lower than or equal to the order $T_L$ and by adding the elements of the decoded differential vector $\hat{S}_f$ and the non-predictive mean vector Y for each order which is lower than or equal to the order p and is higher than the order $T_L$, and outputs the decoded non-predictive LSP parameter vector $\hat{\Phi}_f$. That is, the decoded non-predictive LSP parameter vector $\hat{\Phi}_f$ is $\hat{\Phi}_f=(u_f[i]+y[1]+\hat{s}_f[1], u_f[2]+y[2]+\hat{s}_f[2], \ldots, u_f[T_L]+y[T_L]+\hat{s}_f[T_L], y[T_L+i]+\hat{s}_f[T_L+i], \ldots, y[p]+\hat{s}_f[p])$.

If the non-predictive addition unit 413 receives the control signal C indicating that correction decoding processing is not performed or 0 as the control signal C, in a word, if the peak-to-valley of the spectral envelope is not above the predetermined standard, that is, in the above-described example, in cases other than the case (A-1) and/or (B-1), the non-predictive addition unit 413 generates a decoded non-predictive LSP parameter vector $\hat{\Phi}_f=Y+\hat{S}_f$ that is obtained by adding the decoded differential vector $\hat{S}_f$ and the non-predictive mean vector Y and outputs the decoded non-predictive LSP parameter vector $\hat{\Phi}_f$.

As a result, by preferentially reducing coding distortion of a low-order LSP parameter whose degree of accuracy of approximation may have a greater influence on the efficiency of signal processing which will be described later, it is possible to reduce the code amount as compared to the methods of the first to third embodiments while suppressing an increase in distortion.

<Second Modification>

In the first to fourth embodiments, the linear prediction coefficients $a_f[i], a_f[2], \ldots, a_f[p]$ are used as the input of the LSP calculation unit; for example, a series of coefficients $a_f[1]\times\gamma, a_f[2]\times\gamma^2, \ldots, a_f[p]\times\gamma^p$ obtained by multiplying each coefficient $\alpha_f[i]$ of the linear prediction coefficients by $\gamma$ raised to the ith power may be used as the input of the LSP calculation unit.

Moreover, in the first to fourth embodiments, an object to be coded by the linear prediction coefficient coding device and decoded by the linear prediction coefficient decoding device is assumed to be an LSP parameter, but a linear prediction coefficient itself or any coefficient such as an ISP parameter may be used as an object to be coded and decoded as long as the coefficient is a coefficient which is convertible into a linear prediction coefficient.

<Other Modifications>

The present invention is not limited to the above-described embodiments and modifications. For example, the above-described various kinds of processing may be performed, in addition to being performed in chronological order in accordance with the description, concurrently or individually depending on the processing power of a device that performs the processing or when needed. Other changes may be made as appropriate without departing from the spirit of the present invention.

<Program and Recording Medium>

Moreover, various kinds of processing functions of the devices described in the above-described embodiments and modifications may be implemented by a computer. In that case, the processing details of the functions supposed to be provided in the devices are described by a program. As a result of this program being executed by the computer, the various kinds of processing functions of the above-described devices are implemented on the computer.

The program describing the processing details can be recorded on a computer-readable recording medium. As the computer-readable recording medium, for example, any one of a magnetic recording device, an optical disk, a magneto-optical recording medium, semiconductor memory, and so forth may be used.

Moreover, the distribution of this program is performed by, for example, selling, transferring, or lending a portable recording medium such as a DVD or a CD-ROM on which the program is recorded. Furthermore, the program may be distributed by storing the program in a storage device of a server computer and transferring the program to other computers from the server computer via a network.

The computer that executes such a program first, for example, temporarily stores the program recorded on the portable recording medium or the program transferred from the server computer in a storage thereof. Then, at the time of execution of processing, the computer reads the program stored in the storage thereof and executes the processing in accordance with the read program. Moreover, as another embodiment of this program, the computer may read the program directly from the portable recording medium and execute the processing in accordance with the program. Furthermore, every time the program is transferred to the computer from the server computer, the computer may sequentially execute the processing in accordance with the received program. In addition, a configuration may be adopted in which the transfer of a program to the computer from the server computer is not performed and the above-described processing is executed by so-called application service provider (ASP)-type service by which the processing functions are implemented only by an instruction for execution thereof and result acquisition. Incidentally, it is assumed that the program includes information (data or the like which is not a direct command to the computer but has the property of defining the processing of the computer) which is used for processing by an electronic calculator and is equivalent to a program.

Moreover, the devices are assumed to be configured as a result of a predetermined program being executed on the computer, but at least part of these processing details may be implemented on the hardware.

What is claimed is:

1. A coding device comprising:

processing circuitry configured to obtain a first code by coding a differential vector formed of differentials between a vector of a line spectrum pair parameter sequence of more than one order of a present frame and a prediction vector containing at least a predicted vector from a past frame, and obtain a quantization differential vector corresponding to the first code; and the vector of the line spectrum pair parameter sequence of more than one order of the present frame and the quantization differential vector or formed of some of elements of the differentials.

2. A coding device comprising:

processing circuitry configured to obtain a first code by coding a differential vector formed of differentials between a vector of a line spectrum pair parameter sequence of more than one order of a present frame and a prediction vector formed of at least a prediction based on a past frame and a predetermined vector, and obtain a quantization differential vector corresponding to the first code; and generate a second code by coding a correction vector which is formed of differentials obtained by subtracting the quantization differential vector and a predetermined vector from the vector of the line spectrum pair parameter sequence of more than one order of the present frame or formed of some of elements of the differentials.

3. The coding device according to claim 2, wherein with an assumption that a is a positive constant, the prediction vector is a vector obtained by adding a predetermined predictive mean vector and what is obtained by multiplying a quantization differential vector of the past frame by a factor of $\alpha$, and the correction vector is a vector obtained by subtracting the quantization differential vector and a predetermined non-predictive mean vector from the vector of the line spectrum pair parameter sequence of more than one order of the present frame or a vector formed of some of elements of that vector.

4. A coding method, implemented by a coding device that includes processing circuitry, comprising:

a predictive coding step in which the processing circuitry obtains a first code by coding a differential vector formed of differentials between a vector of a line spectrum pair parameter sequence of more than one order of a present frame and a prediction vector containing at least a predicted vector from a past frame, and obtains a quantization differential vector corresponding to the first code; and a non-predictive coding step in which the processing circuitry generates a second code by coding a correction vector which is formed of differentials between the vector of the line spectrum pair parameter sequence of more than one order of the present frame and the quantization differential vector or formed of some of elements of the differentials.

5. A coding method, implemented by a coding device that includes processing circuitry, comprising:

a predictive coding step in which the processing circuitry obtains a first code by coding a differential vector formed of differentials between a vector of a line spectrum pair parameter sequence of more than one order of a present frame and a prediction vector formed of at least a prediction based on a past frame and a predetermined vector, and obtains a quantization differential vector corresponding to the first code; and a non-predictive coding step in which the processing circuitry generates a second code by coding a correction vector which is formed of differentials obtained by subtracting the quantization differential vector and a predetermined vector from the vector of the line spectrum pair parameter sequence of more than one order of the present frame or formed of some of elements of the differentials.

6. The coding method according to claim 5, wherein with an assumption that a is a positive constant, the prediction vector is a vector obtained by adding a predetermined predictive mean vector and what is obtained by multiplying a quantization differential vector of the past frame by a factor of $\alpha$, and the correction vector is a vector obtained by subtracting the quantization differential vector and a predetermined non-predictive mean vector from the vector of the line spectrum pair parameter sequence of more than one order of the present frame or a vector formed of some of elements of that vector.

7. A non-transitory recording medium comprising instructions which, when executed by a computer, cause the computer to perform the steps of the coding method according to any one of claims 4 to 6.

* * * * *